(12) United States Patent
Apel et al.

(10) Patent No.: US 6,806,701 B2
(45) Date of Patent: Oct. 19, 2004

(54) ROTATION ANGLE SENSOR

(75) Inventors: Peter Apel, Suedkirchen (DE); Klaus Wilczek, Werne (DE)

(73) Assignee: AB Elektronik GmbH, Werne (DE)

( * ) Notice: Subject to any disclaimer, the term of this patent is extended or adjusted under 35 U.S.C. 154(b) by 0 days.

(21) Appl. No.: 10/270,776

(22) Filed: Oct. 10, 2002

(65) Prior Publication Data

US 2003/0076088 A1 Apr. 24, 2003

Related U.S. Application Data

(63) Continuation-in-part of application No. 09/788,630, filed on Feb. 15, 2001, now abandoned.

(30) Foreign Application Priority Data

Feb. 15, 2000 (DE) .................................. 200 02 719 U
Feb. 28, 2000 (DE) .................................. 200 03 512 U

(51) Int. Cl.[7] .............................................. G01B 7/30
(52) U.S. Cl. ............................ 324/207.2; 324/207.25
(58) Field of Search ........................ 324/207.2–207.25; 264/272.11, 272.14; 174/52.2; 310/68 B, 71

(56) References Cited

U.S. PATENT DOCUMENTS

| | | | | |
|---|---|---|---|---|
| 2,536,805 A | * | 1/1951 | Hansen, Jr. .................. 324/253 |
| 3,194,990 A | * | 7/1965 | Kendall ........................ 310/10 |
| 4,757,603 A | * | 7/1988 | Stokes .......................... 29/598 |
| 4,948,277 A | | 8/1990 | Alff ............................. 384/448 |
| 4,994,739 A | * | 2/1991 | Honda et al. ............ 324/207.14 |
| 5,309,053 A | * | 5/1994 | Ade ............................... 310/71 |
| 5,332,965 A | * | 7/1994 | Wolf et al. ............. 324/207.12 |
| 5,444,369 A | * | 8/1995 | Luetzow .................. 324/207.2 |
| 5,446,626 A | * | 8/1995 | Dittmann et al. ............ 361/785 |
| 5,528,139 A | * | 6/1996 | Oudet et al. .............. 324/207.2 |
| 5,609,184 A | * | 3/1997 | Apel et al. .................. 137/554 |
| 5,668,422 A | * | 9/1997 | Deynet ........................ 310/71 |
| 5,861,745 A | * | 1/1999 | Herden .................... 324/207.2 |
| 6,049,043 A | * | 4/2000 | Tonejc .......................... 174/250 |
| 6,124,710 A | * | 9/2000 | Kordecki .................. 324/207.2 |
| 6,232,771 B1 | * | 5/2001 | Herden et al. .......... 324/207.25 |
| 6,448,761 B1 | * | 9/2002 | Stumpe et al. ............ 324/207.2 |
| 6,501,265 B2 | * | 12/2002 | Nakamura et al. ....... 324/207.2 |
| 6,515,472 B2 | * | 2/2003 | Wurn et al. ............... 324/207.2 |

FOREIGN PATENT DOCUMENTS

| | | |
|---|---|---|
| DE | 19903490 A1 | 8/2000 |
| DE | 29909201 U1 | 10/2000 |
| DE | 29908409 U1 | 11/2000 |
| FR | 2764372 A1 | 12/1998 |
| WO | WO 95/14911 | 6/1995 |
| WO | WO 98/55828 | 12/1998 |

* cited by examiner

*Primary Examiner*—Anjan Deb
*Assistant Examiner*—Darell Kinder
(74) *Attorney, Agent, or Firm*—Milde & Hoffberg, LLP

(57) ABSTRACT

A rotation angle sensor for use in a throttle adjustment device is disclosed, which includes a stator unit having at least two stator part elements positioned relative to each other leaving a spacer recess therebetween; a Hall sensor positioned in the spacer recess; a rotor unit having a magnetic element having a connector element molded into the rotor unit; a plug unit; and a housing unit adapted to partially house the stator unit.

42 Claims, 23 Drawing Sheets

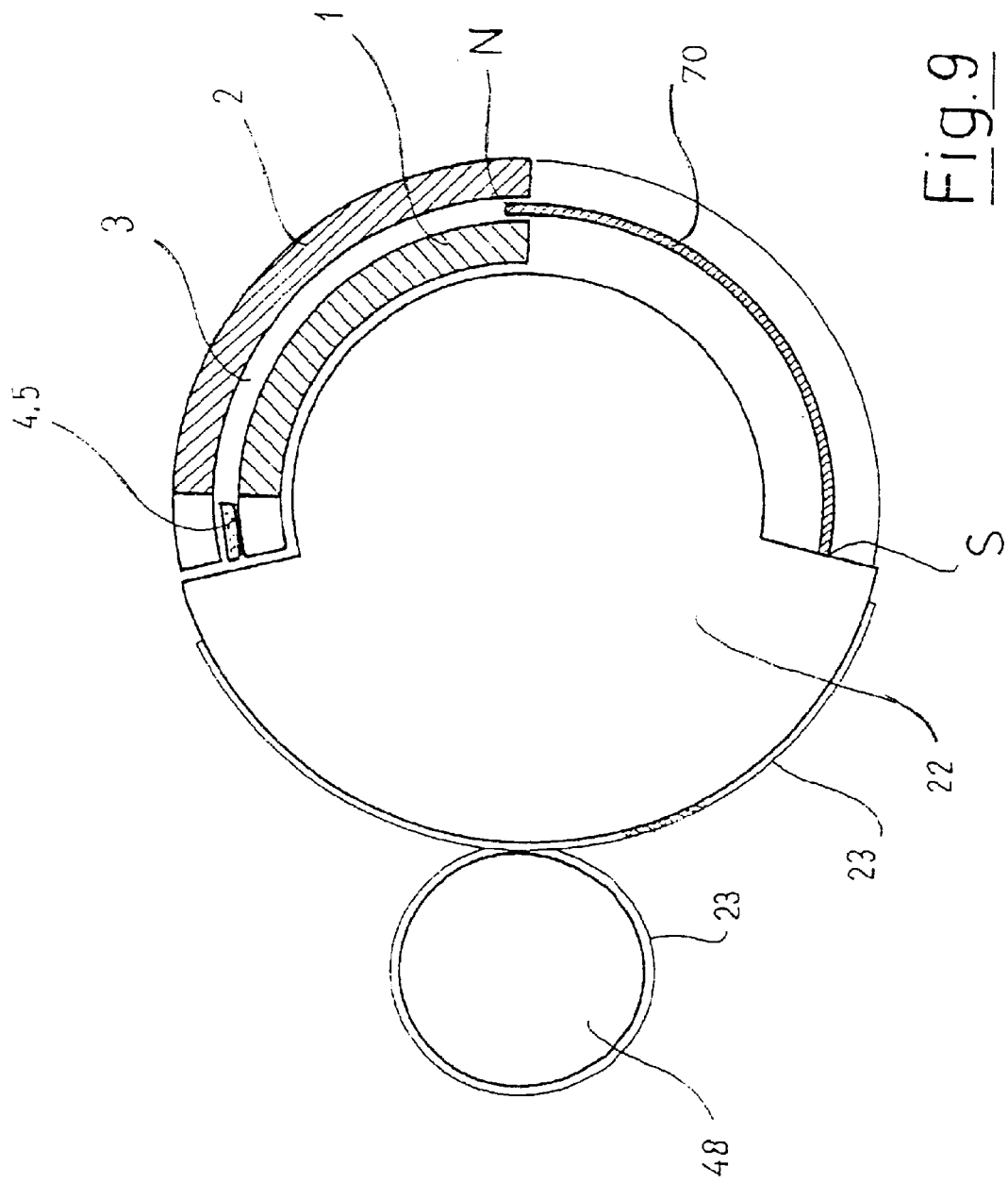

ROTATION ANGLE SENSOR

CROSS-REFERENCE TO RELATED APPLICATION

This application is a continuation-in-part of U.S. patent application Ser. No. 09/788,630, filed Feb. 15, 2001, and entitled "ROTATION ANGLE SENSOR", now abandoned.

BACKGROUND OF THE INVENTION

The present invention relates to rotation angle sensors.

Rotation angle sensors, especially for throttle adjustment devices, are known. These sensors have at least a stator unit having at least two stator part elements that are arranged relative to each other, leaving a spacer recess in which at least one Hall sensor is positioned, a rotor unit with at least one magnetic element movable relative to the stator unit, a plug unit and a housing unit, in which at least the stator is at least partially housed.

A rotation angle sensor for a throttle adjustment device of the type just mentioned is known from WO 9 514 911 A1. A throttle is arranged to rotate with a throttle shaft in a closed throttle housing. The rotation angle sensor is connected to the throttle shaft and consists of a stationary and a rotating unit. A Hall element is arranged between two stator part elements of the stationary unit. The rotating unit has an annular magnet that can be moved around the stator element.

The rotation angle sensor is arranged here in a housing recess and is mounted separately from the outside on the throttle housing. If a motor unit and gear unit are used as drive unit, these are accommodated, together with the rotation angle sensor and a circuit unit, simply in an actuator housing. The actuator housing is then also plugged in. In both cases, it is visible from the exterior that the throttle housing is equipped with additional parts.

DE 199 03 490 A1 modifies the rotation angle sensor, so that both the stationary and rotating unit are accommodated in a cover element. The cover element can also accept a gear mechanism of the throttle adjustment unit. The housing of the throttle adjustment unit can be closed by means of the cover element so equipped.

The magnetic element and the stator part elements are designed segmented in DE 299 09 201 U1 and DE 299 08 409 U1. It is proposed for better positioning of these segments to mold the stator segments either into a cover element or housing element and to form at least the magnetic segment in the gear of a gear mechanism, in which it is not stated how this molding is to occur. A rotation angle sensor, in which the stator elements and magnetic element are designed as partial annular segments, is known from WO 98 55 828 A1 (FR 27 64 372 A1).

The material expense for these parts is certainly reduced because of this, but the manufacturing and assembly expense are still too high.

It is known from U.S. Pat. No. 4,948,277 to embed a ring having a number of teeth in a plastic element. However, embedding is only carried out to seal off the rotor of a coder. These and other drawbacks are known in the prior art.

Another device of the type mentioned above is known from DE 196 30 764 A1, where said device consists of a partial stator element that stretches across 240° and an additional partial stator element that stretches across 120°. Two radially oriented openings are located between the two partial stator elements. A Hall unit is located in one of the openings. A movable magnet element is located in the partial stator elements. The disadvantage of the radially oriented openings is that the manufacturing process is very elaborate. In addition, the polarity of the magnet elements does not permit a full utilization of the angle magnification.

Additionally rotation angle sensors are known to the applicant from WO 98 25 102 A1, DE 197 16 985 A1, DE 199 03 940 A1 or EP 1 024 267 A2.

SUMMARY OF THE INVENTION

In an example embodiment, a rotation angle sensor for use in a throttle adjustment device includes a stator unit having at least two stator part elements positioned relative to each other leaving a spacer recess therebetween; a Hall sensor positioned in the spacer recess; a rotor unit having a magnetic element having a connector element molded into the rotor unit; a plug unit; and a housing unit adapted to partially house the stator unit.

In another embodiment, the rotation angle sensor may include a stator unit having at least two stator part elements each having a connector element, positioned relative to each other leaving a spacer recess therebetween; at least one Hall sensor positioned in the spacer recess; a rotor unit with at least one annular magnetic part element; a plug unit at least partially house the stator unit, wherein at least the connector element of the stator part elements and the stamped lead assembly are at least partially molded into the housing element.

In yet another embodiment, a rotation angle sensor as discussed above may include a housing unit in which at least the stator unit is at least partially houses, and the annular magnetic part element has a connector element positioned with the magnetic segment in said rotor unit. In a further embodiment, a rotation angle sensor for use in a throttle adjustment device may include a stator unit having at least two stator part elements positioned relative to each other leaving a spacer recess therebetween; a Hall sensor positioned in the spacer recess; a rotor unit having at east one annular magnetic part element, and movable relative to said stator unit, wherein the magnetic part element has at least one magnetic segment with at least one flux conductor sheet thereon; a plug unit; and a housing unit in which at least the stator unit is at least partially housed.

In another embodiment, a rotation angle sensor with a rotor unit having at least one annular magnetic part element having at least one magnetic segment having a connector element, in which the magnetic part element is molded at least with the connector element into the rotor unit. Furthermore, connector elements of the stator part elements and a stamped lead assembly are at least partially molded into the housing.

In another embodiment, a rotation angle sensor includes a rotor unit having an annular magnetic part element having at least one magnetic segment with at least one flux conductor sheet located thereon, in which the magnetic segment and the flux conductor sheet are molded at least partially into the rotor unit.

In another embodiment of the invention, the asymmetric partial stator elements are partial rings, in a ratio of 2/3 to 1/3, divided along a straight line. The partial stator elements surround the rotor unit, which comprises a magnet element and a magnetic support unit. The magnet element has two bi-polar partial magnet segments, mounted on the magnetic support element. This embodiment can be manufactured easily and utilizes a maximum possible angle magnification.

The advantages accomplished with this embodiment of the invention consist primarily in that the two partial stator elements can be manufactured more easily due to the horizontally designed spacing openings. Furthermore, through the tangential arrangement of the spacing openings, the angle magnification up to 120° is fully utilized and is, therefore, available for measurements. Both spacing openings can be arranged in one plane or offset at essential reference-cylindrical partial stator elements.

For a full understanding of the present invention, reference should now be made to the following detailed description of the preferred embodiments of the invention as illustrated in the accompanying drawings.

BRIEF DESCRIPTION OF THE DRAWINGS

FIG. 9 shows an enlarged partial cutout of a rotation angle sensor according to FIG. 1a with a rotor unit in a schematic top view.

DESCRIPTION OF THE PREFERRED EMBODIMENTS

Figure 1A:
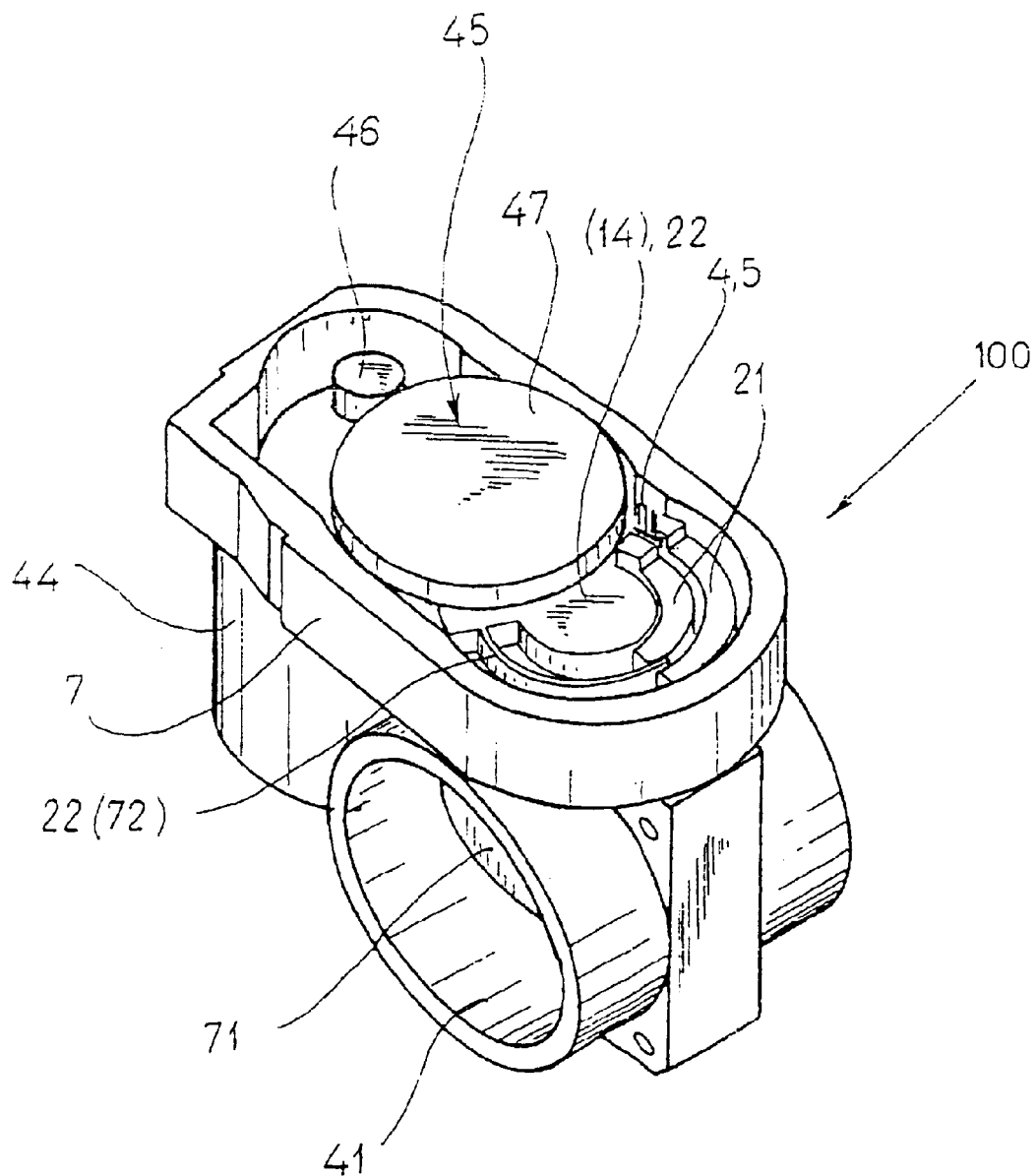
FIG. 1a shows a first variant of a rotation angle sensor in a schematic perspective view.

The preferred embodiments of the present invention will now be described with reference to FIGS. 1–17c of the drawings. Identical elements in the various figures are designated with the same reference numerals.

A throttle rotation angle sensor 100 is depicted in FIG. 1a. It includes a throttle unit, having a throttle housing 41 and a throttle 71 adjustably arranged in the throttle housing 41 via a throttle shaft. A cover element 7 carrying a motor 44 is arranged on the throttle housing 41. The cover element 7 may be manufactured as a closed formation. It may also be manufactured as an open configuration, which is then closed with a separate cover.

As further shown in FIG. 1a, a gear mechanism 45, a stator unit 21 and a rotor unit 22 of a Hall effect rotation angle sensor device are arranged in cover element 7. The gear mechanism 45 can be designed as an ordinary gear mechanism or as a planetary gear mechanism. In an example embodiment it may include a motor pinion 46, which is connected to the shaft of motor 44. The motor pinion 46 operates together with an intermediate pinion 47, on whose bottom (cf. also FIG. 9) an adjustment pinion 48 is arranged. The adjustment pinion 48 again operates with a gear 22 designed as a gear segment, which is connected or connectable to the throttle shaft.

The configuration of the stationary and moving units is an important aspect of the invention. As shown in FIG. 9, the stationary unit is formed by two opposite stator part segments 1,2. The stator part segments 1,2 may be held in housing element 7. An air gap 15, which is simultaneously also a stator spacing recess 3, on whose end one or two Hall sensors (ASIC) 4,5 are arranged, is situated between the two stator segments.

The gear segment 22 operates on about ⅓ of its periphery, together with the adjustment pinion 48, both gears having toothing 23. The gear segment 22 is connected to a spring secured in cover element 7. This guarantees that the gear segment 22 is always rotated into a defined end position. Rotation of gear segment 22 into the prescribed end position ensures that the throttle rotation angle sensor 100 also assumes a defined end position. A shaft sealing ring 72 is arranged at least between gear segment 22 and cover element 7 for sealing purposes.

As shown in FIG. 9, a semicircular additional segment lies opposite the toothed segment of gear segment 22, which is spaced relative to stator part segment 1. A partial annular magnetic part element 70 is molded on one side of this segment as a rotating unit. Owing to the fact that the gear segment 22 consists of plastic, the partial circular annular magnetic part element 70 must be shaped true to position and precisely. During rotation of gear segment 22, the annular magnetic part element 70 travels like a sickle in the spacer recess denoted 3 and thus produces a variable Hall voltage value.

Figure 1B:
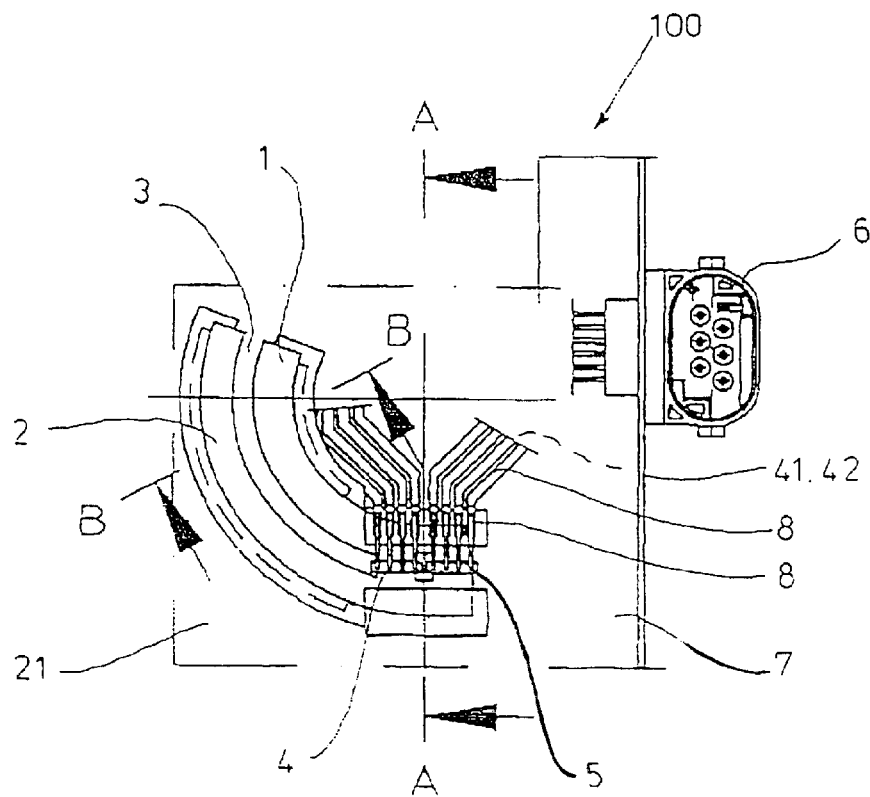
FIG. 1b shows a stator unit of a rotation angle sensor according to FIG. 1a, with a first variant of a stamped lead assembly in a schematically depicted top view.
Figure 2:
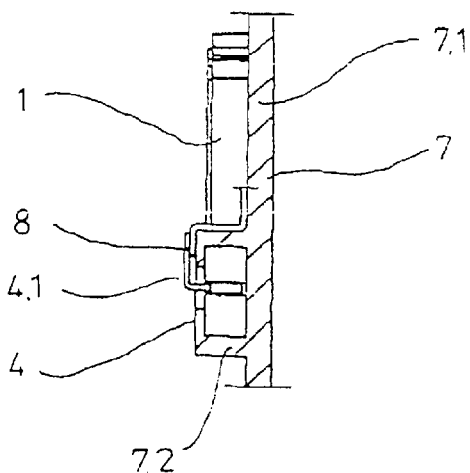
FIG. 2 shows a section through a stator unit according to FIG. 1b along line A—A.
Figure 3:
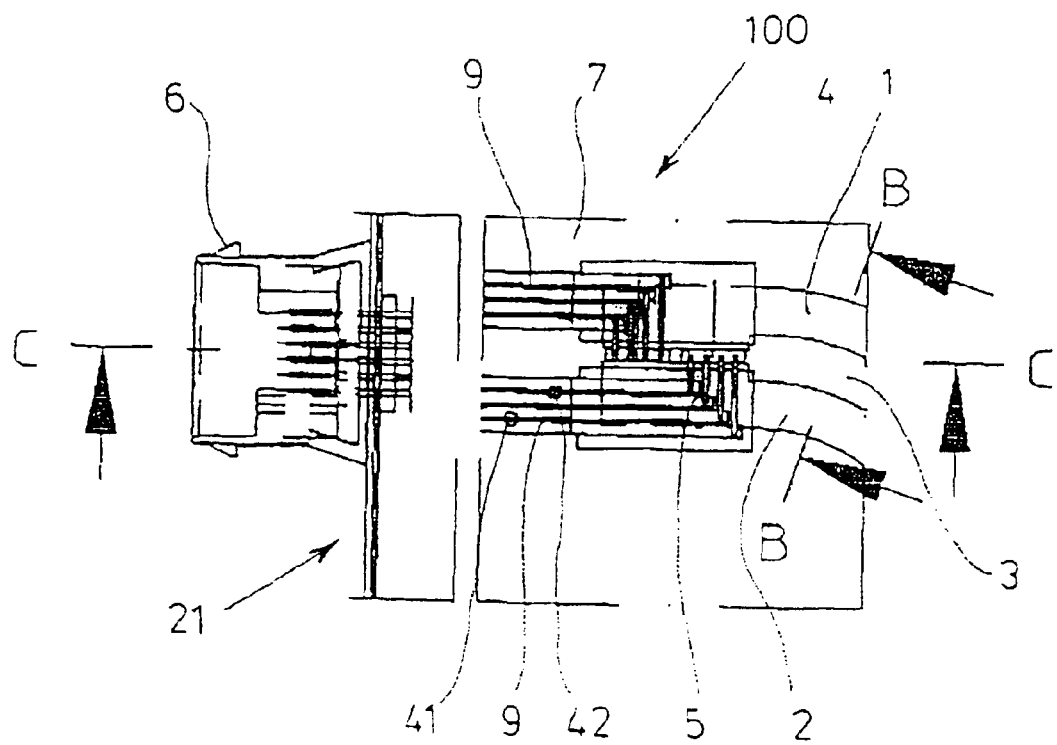
FIG. 3 shows a stator unit of a rotation angle sensor according to FIG. 1a, with a second variant of a stamped lead assembly in a schematically depicted top view.
Figure 4:
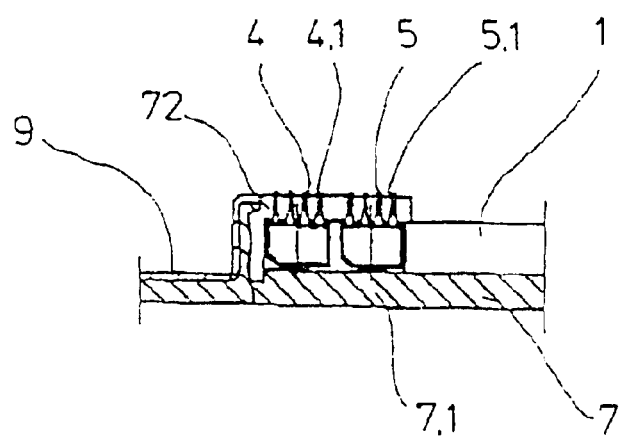
FIG. 4 shows a section through a rotation angle sensor according to FIG. 3 along line C—C.

The stator unit 21 of the rotation angle sensor with the stator segment 1 and the stator segment 2, which are arranged relative to each other, thus creating the spacer recess 3, are shown in detail in FIGS. 1b and 3.

In an example embodiment, the stator segments may be designed as pitch circles. The pitch circle can have an angle between 80° and 180°. As a result of longer experiments, it was found that a quarter pitch circle of 115° generates the most accurate measured values. The two opposite sickle-like configurations of stator segments 1,2 result from this.

A Hall sensor 4 and a Hall sensor 5 are arranged on one end of the opposite stator segments in the spacer recess 3. Both Hall sensors have a number of adjacent sensor contacts 4.1,5.1.

It is an important aspect of the invention that connection of the Hall sensors 4,5 to plug unit 6 be conducted through a pressed screen stamped lead assembly 8,9. It is to be understood that any other unit for connection purposes of the pressed screen stamped lead assembly may be used instead of the plug unit 6. The pressed screens 8,9 are punched out from a sheet, leaving at least one connector between the individual pressed screen stamped lead assembly conductor tracks. A variety of different components, such as components 41,42 may be arranged on the stamped lead assembly 8,9.

The stamped lead assembly 8 is depicted in FIG. 1*b*. In this first variant, the individual conductor tracks of the stamped lead assembly 8 are guided parallel to the sensor contacts 4.1,5.1. The conductor tracks of the stamped lead assembly 8 are angled so that a V-shaped configuration is produced in the top view of the two adjacent pressed screens stamped lead assembly 8.

The stamped lead assembly 9 is shown in FIG. 3. In this second variant, the individual conductor tracks of the stamped lead assembly 9 are guided in series to the adjacent sensor contacts 4.1,5.1, so that an essentially U-shaped configuration of the two opposite pressed screens stamped lead assembly 9 is obtained in the top view. The lower arm of the U is divided into a connection to the sensor contacts 4.1 of the Hall sensor and an additional connection to the sensor contacts 5.1 of Hall sensor 5. The adjacent conductor tracks of the two stamped lead assemblies are then guided to the plug contact 6.

Figure 5A:
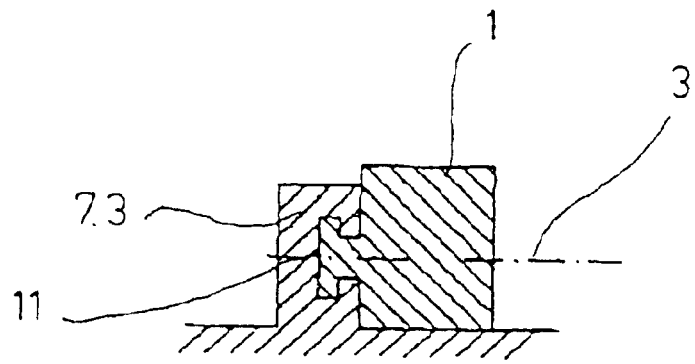
FIGS. 5a to 5d shows a stator segment with differently designed connectors, shown in enlarged sectional views of a section through a rotation angle sensor according to FIGS. 1 and 3 along line B—B.

It is also an important aspect of the invention that the stator segments have a connector. In FIG. 5*a*, a T-side connector 11 is formed on the stator segment 1. The T-shaped side connector 11 consists of an arm connector molded onto the stator segment 1, to which a transversely lying connector with comparative thickness is connected.

Figure 5B:
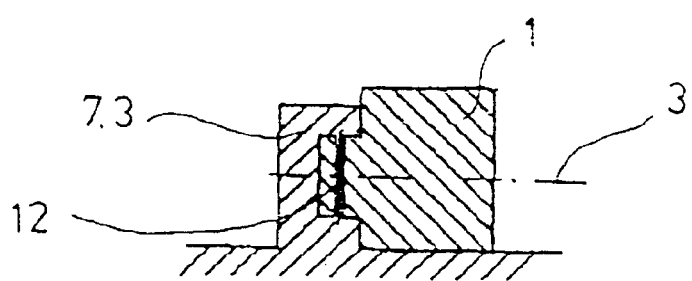

In FIG. 5*b*, an I-side connector is molded onto the stator segment 12. It consists of a connector molding into which a bead is at least partially introduced.

Figure 5C:
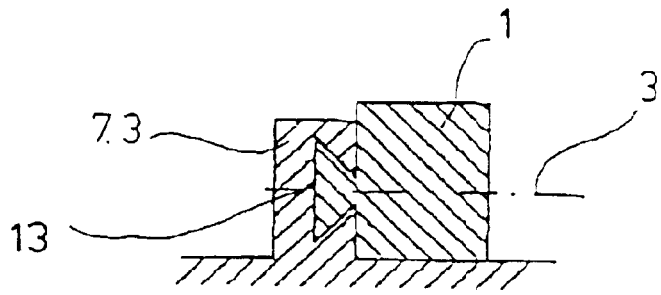

In FIG. 5*c*, a V-side connector 13 is molded on the side of the stator segment 1. The V-side connector has a dovetail configuration and is molded laterally with its dovetail onto the stator segment 1.

Figure 5D:
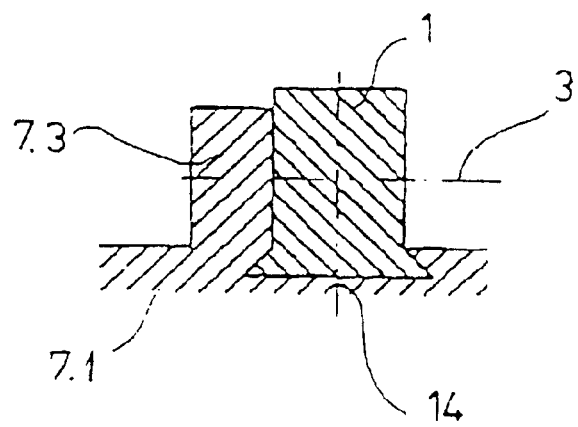
Figures 6, 7:
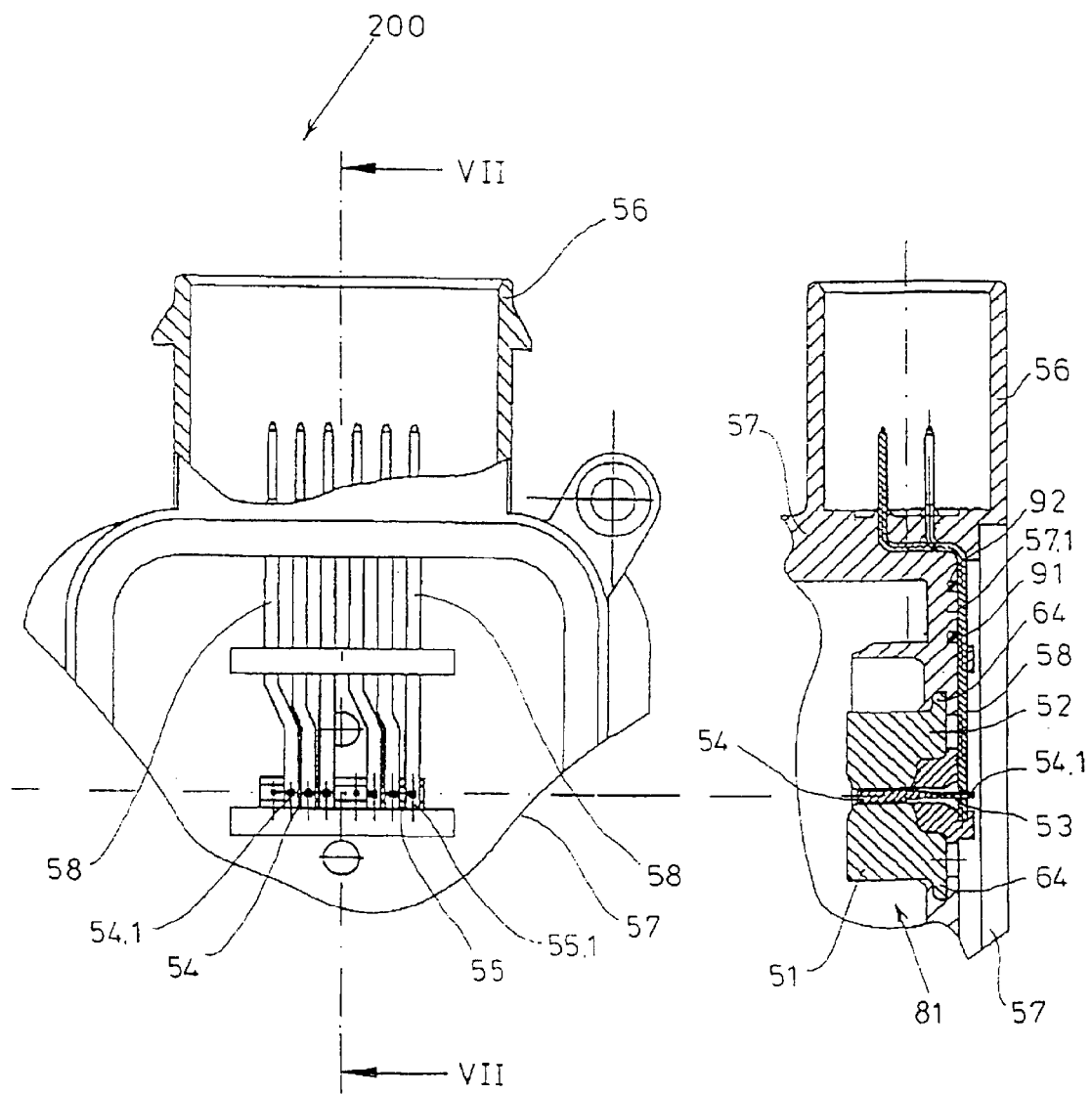
FIG. 6 shows a second variant of a rotation angle sensor with a third variant of a stamped lead assembly in a schematically depicted top view.
FIG. 7 shows a section through a rotation angle sensor according to FIG. 6 along line VII—VII.
Figures 8A, 8B:
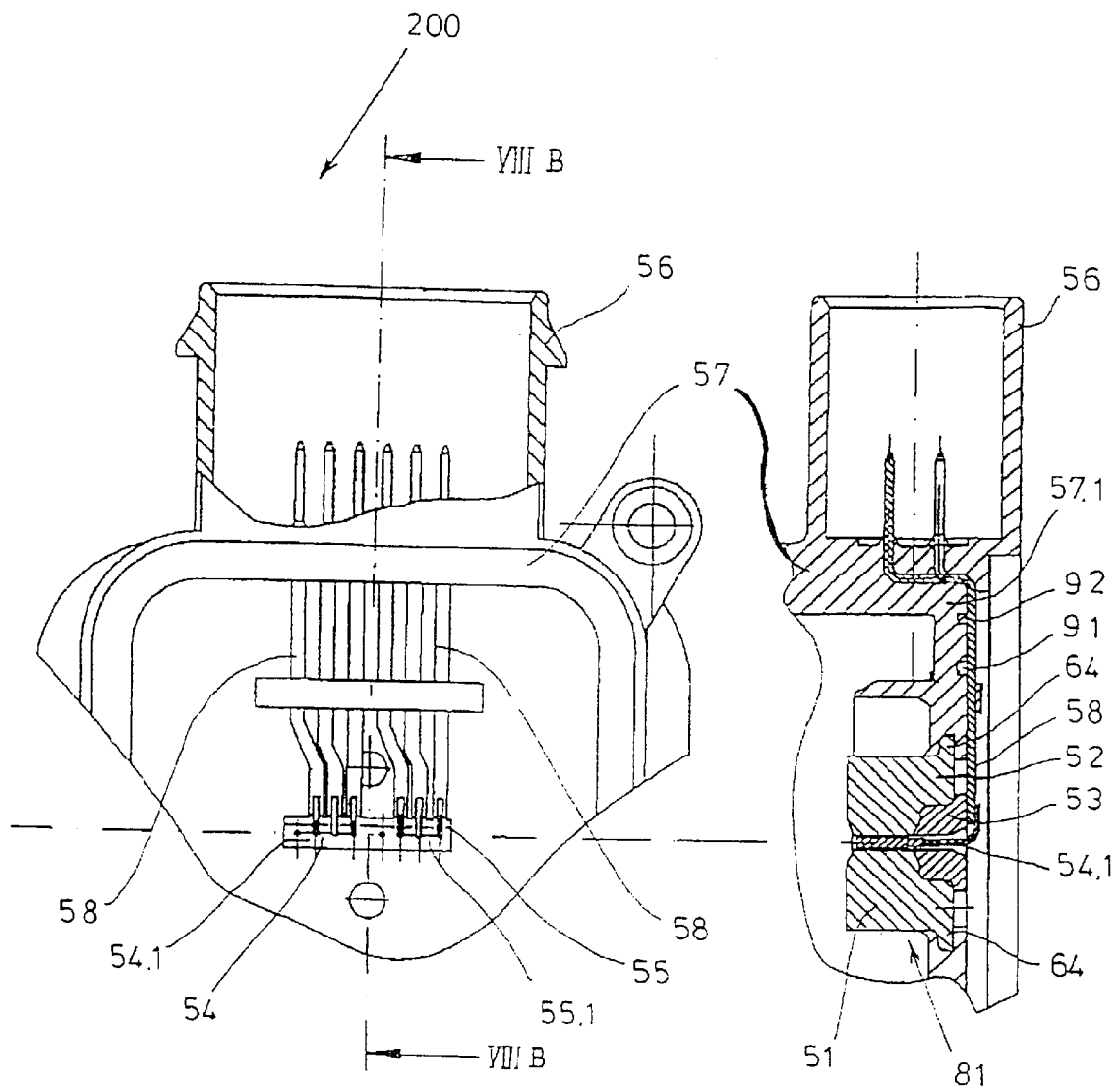
FIG. 8a shows a second variant of a rotation angle sensor with a fourth variant of a stamped lead assembly in a schematically depicted top view.
FIG. 8b shows a section for a rotation angle sensor according to FIG. 8 along line IX—IX.

In FIG. 5*d*, the stator segment 1 is modified into a reverse V-foot connector 14. The V-foot connector is designed in cross section as a truncated pyramid.

The T-side connector 11, the I-side connector 12, the V-side connector 13 and the V-foot connector 14 follow in their configuration the pitch circle-shaped stator segment 1. As in stator segment 1, such connectors 11 . . . 14 are also molded onto stator segment 2.

The cover element is denoted 7 in FIGS. 1*a*, 1*b* and 3. The cover element 7 may be formed from a magnetically and/or electrically nonconducting material. In an example embodiment, this material can be a plastic.

In another aspect of the invention, the connectors 11 . . . 14 of stator segments 1,2 and the stamped lead assembly 8,9 and the components may be molded in during formation of cover element 7. As shown in FIGS. 5*a* to 5*d*, the connectors 11–14 of stator segments 1,2 are molded into a cover stator wall 7.3 or into a cover wall 7.1, which are simultaneously molded with the cover element. Owing to their special configuration, the connectors 11. . . 14 ensure that the stator segments 1,2 are secured and, above all, in the correct position. The spacer recess 3 is designed most accurately, and also true to position on this account.

A cover sensor block 7.2 is formed in the region of Hall sensors 4,5 with the cover wall. The cover sensor block 7.2 is designed higher than the cover stator wall 7.3 relative to the two Hall sensors 4,5. The cover sensor block 7.2 reaches at least to the sensor contacts 4.1, 5.1. It can either leave the sensor contacts free or be molded with them. If the sensor contacts remain free, they are available at any time for testing and control purposes. If, on the other hand, they are enclosed by the material of the cover element 7, just like the screens stamp lead assembly 8,9, they are completely shielded and insulated relative to all influences.

When the stamped lead assembly are formed, connectors present during the forming phase of the cover element between the individual conductor tracks of stamped lead assembly 8,9 are removed.

When the cover element 7 so equipped is finished, the housing 43 of a throttle unit can be closed with it.

The stator segments 1,2 and the stamped lead assembly 8,9 can be formed in the housing of the throttle unit or a separate sensor housing in the same manner, instead of in cover element 7. The components may also be molded in here. The housing need only be formed partially from a magnetically and/or electrically nonconducting material. And only the part that accommodates the rotation angle sensor 100. The other parts of the housing of the throttle unit are formed from iron or the like.

The shape and design of the stamped lead assembly is not constrained to the shapes according to pressed screens 8,9. The stamped lead assembly can be punched out in the configurations for a line connection of the Hall sensors 4,5 to a takeoff unit point for the signals, which is a plug unit designated 6 here.

An alternative embodiment of a stator unit 81 of a rotation angle sensor 200 is depicted in FIGS. 6 to 8*b*.

The stator unit 81 consists of two stator half-disks 51,52, designed in the shape of apple segments. The stator half-disks 51,52 leave a spacer recess 53 open between them. Each has an L-foot connector 64.

In the spacer recess 53, a Hall sensor 54 with sensor contacts 54.1 and a Hall sensor 55 with sensor contacts 55.1 are arranged.

The plug contacts 54.1,55.1 are each connected to a pressed screen stamped lead assembly 58,59 and lead to the plug contacts of a plug unit 56.

The rotation angle sensor has a sensor housing 57, which is also formed from an electrically and/or magnetically nonconducting material, such as plastic. During forming of the sensor housing, the stator half-disks, with their L-foot connectors 64 and the two versions 58,59 of the stamped lead assembly, are simultaneously molded in.

The stamped lead assembly 58 is guided right beneath the sensor contacts. It may also be shaped like the stamped lead assembly 8. Each sensor contact 54.1,55.1 of the Hall sensors 54,55 is connected to a conductor track of stamped lead assembly 58.

The sensor contacts 54.1,55.1 of the Hall sensors, as shown in FIGS. 8 and 9, are angled L-shaped. The stamped lead assembly is introduced to these angled sensor contacts. The stamped lead assembly 59 is also designed straight. The stamped lead assembly 58,59, however, depending on the corresponding use conditions, can also be designed differently, as already mentioned. Various components such as components 91,92 may also be arranged on the stamped lead assembly 58,59.

Electrical connection of the stamped lead assembly 58,59 to the sensor contacts 54.1,55.1 occurs as in the stamped lead assembly 8,9 and the sensor contacts 4.1,5.1 by welding, bonding, soldering, crimping or by another known form of connection.

During forming of sensor housing 57, the foot connector 64 of the stator half-disks 51,52 and the pressed screens stamped lead assembly 58,59, as well as the components, are molded in and secured in the correct position. The stamped lead assembly and components are also protected from external influences.

The rotor unit 22 according to FIG. 9, which is moved relative to stator unit 21 according to FIGS. 1a to 5d, is depicted in FIGS. 10a to 12f with differently designed annular magnetic part elements 70.

The rotor unit 22, as already explained, is designed here as a gear 22 of gear mechanism 45.

The gear 22, which has toothing 23, is formed from a magnetically and/or electrically nonconducting material, like plastic or the like.

Figure 11A:
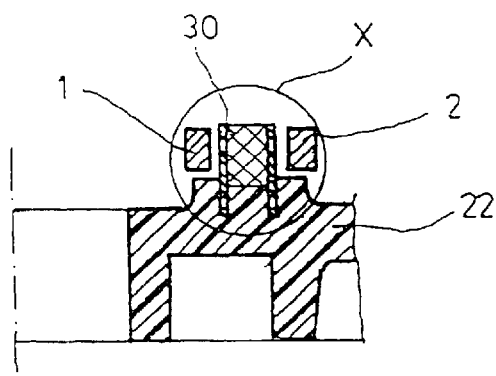
FIGS. 11a to 11f shows a section through a rotor according to FIGS. 10a to 10f along line XI A-XI A to line XI F-XI F.

The annular magnetic part element 70 can be formed as follows:

According to FIG. 11a, the magnetic element consists of two magnetic segments 30,31, which are bounded on both sides by a flux conductor sheet 32,33. Its north pole N is directed toward the flux conductor sheet 33 and its south pole S toward the flux conductor sheet 32. As the S and N in parentheses show, it can also be reversed.

During forming of gear 22, the two magnetic segments and the two flux conductor sheets are molded in simultaneously, and the free space situated between them filled in with a plastic element 34. This ensures that both magnetic segments and the flux conductor sheets 32,33 are held in the correct position. It is of special significance that costly magnetic material is saved by this configuration. The two magnetic segments 30,31 need only be designed long enough so that they make up between about three to 15 percent of the angular length of the two flux conductor sheets. The magnetic flux from both magnetic segments, which are poled as already described, is further conveyed by the two flux conductor sheets 32,33. The flux conductor sheets also assume a protective function, especially during transport of the sensor parts or the entire sensor 100.

Figure 12A:
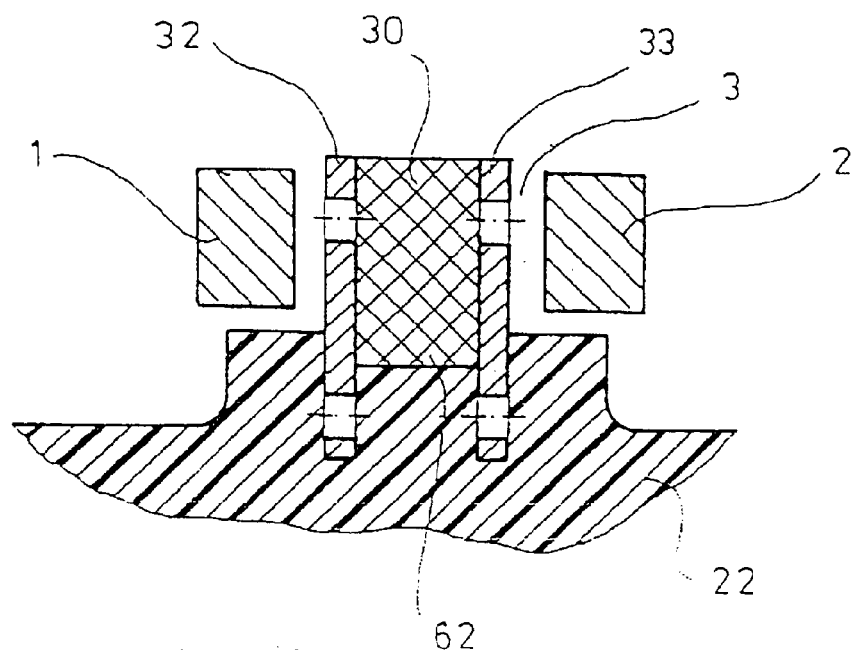
FIGS. 12a to 12f shows a cutout X from a cross sectional view according to FIGS. 11a to 11f.

FIG. 12a shows that the magnetic segments with the two flux conductor sheets are to be moved in the spacer recess 3 between the stator segment 1 and the stator segment 2. The varying magnetic flux conducted through the stator segments 1,2 via Hall sensors 4, 5 generates output signals that are a gauge of the excursion of gear 22.

It is also apparent from FIG. 12a that the magnetic segments are held in the plastic of gear 22 by an I-side connector 62.

Figure 12B:
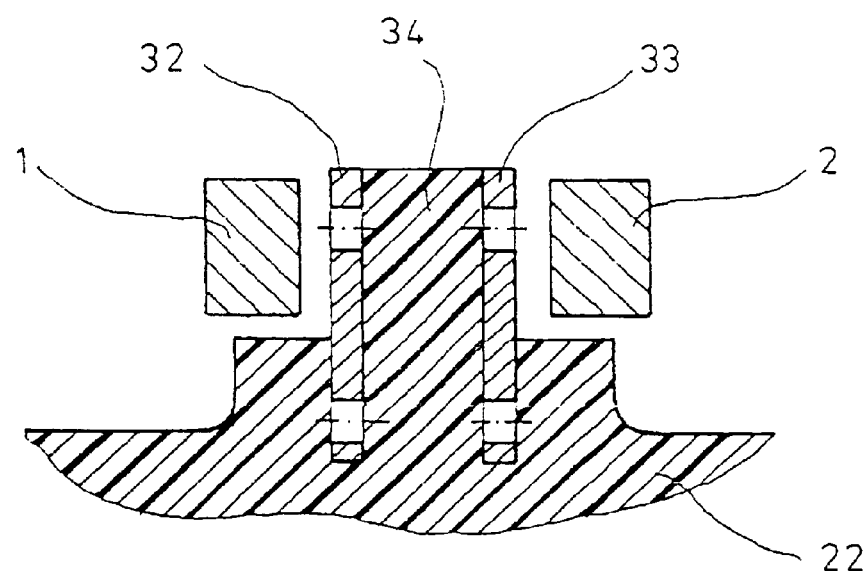

According to FIGS. 10b, 11b and 12b, the magnetic elements consist only of magnetic segment 30, on both sides of which the flux conductor sheets 32,33 are molded into the material of gear 22.

In FIG. 12b, the plastic element 34 molded between the flux conductor sheets is readily apparent. If the gear is formed from another material, the element denoted 35 consists of this material. If the material is magnetically conducting, the magnetic segment and the flux conductor sheets are molded into the insulating plastic.

Figure 10A:
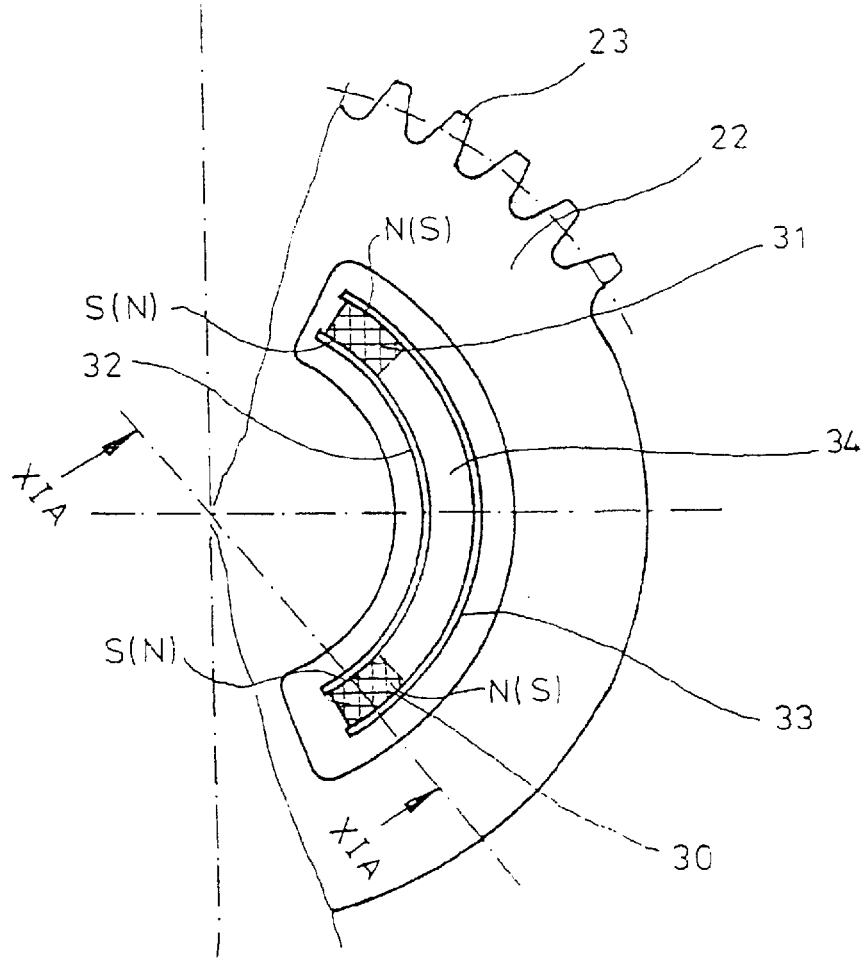
FIGS. 10a to 10f shows a rotor unit according to FIG. 9 for a rotation angle sensor according to FIGS. 1 to 5d with differently designed annular magnetic part elements in a schematically depicted partial top view.
Figure 11:
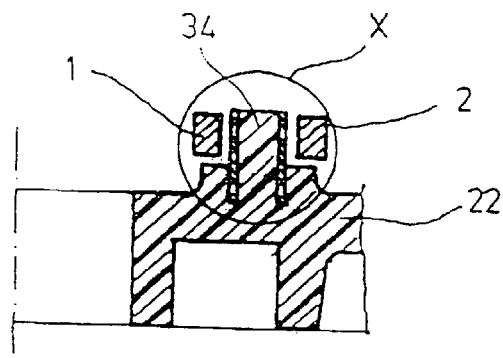
Figure 10:
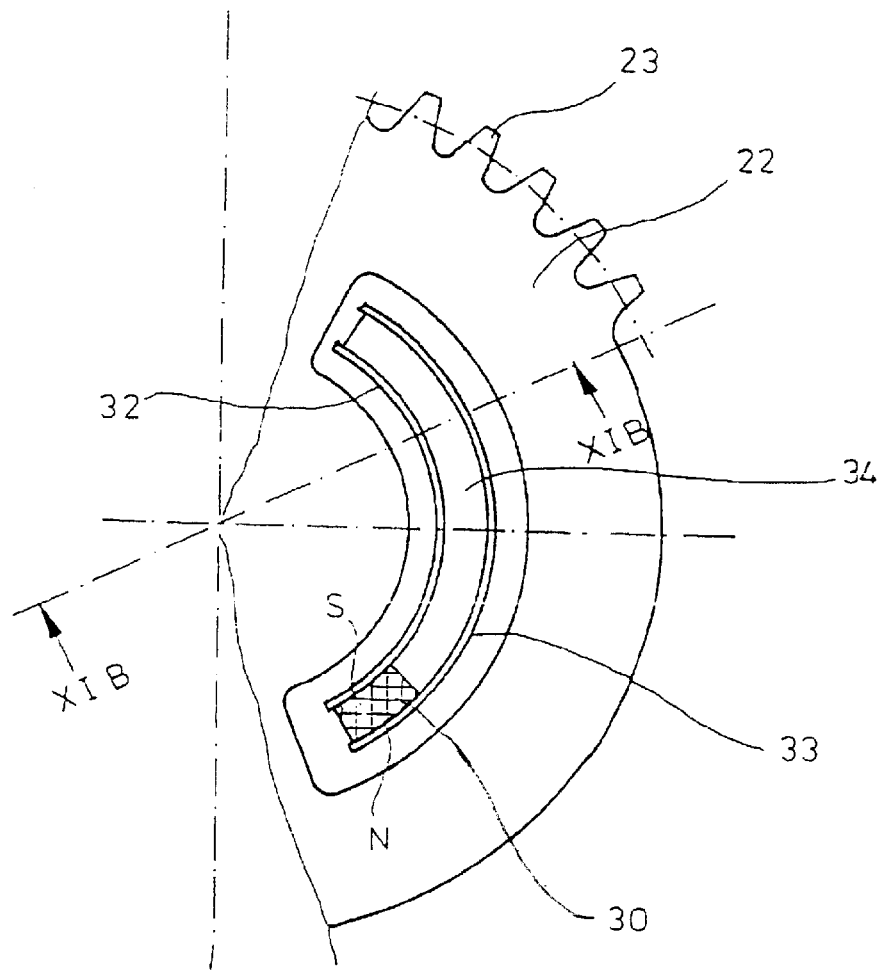
Figure 11C:
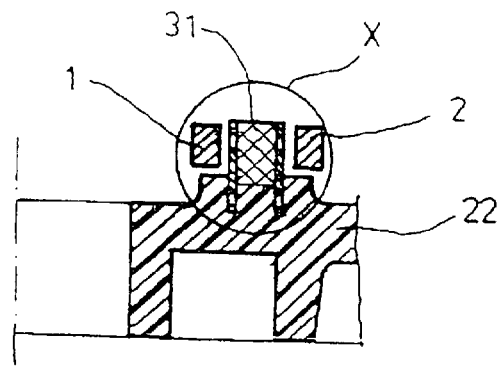
Figure 10C:
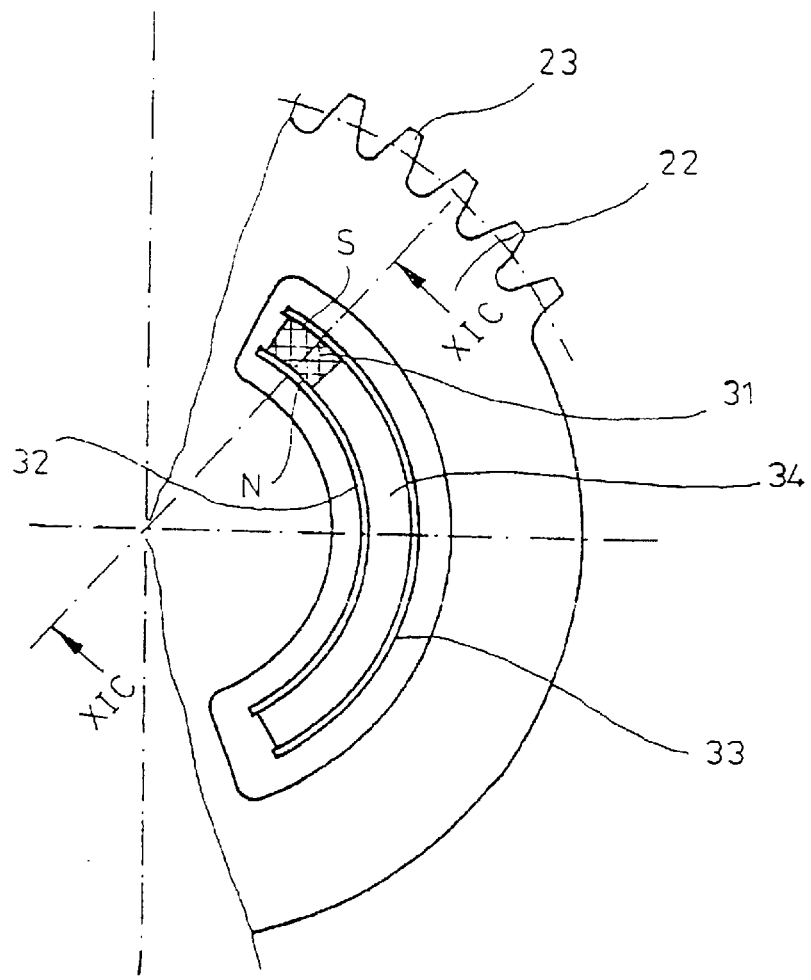
Figure 12C:
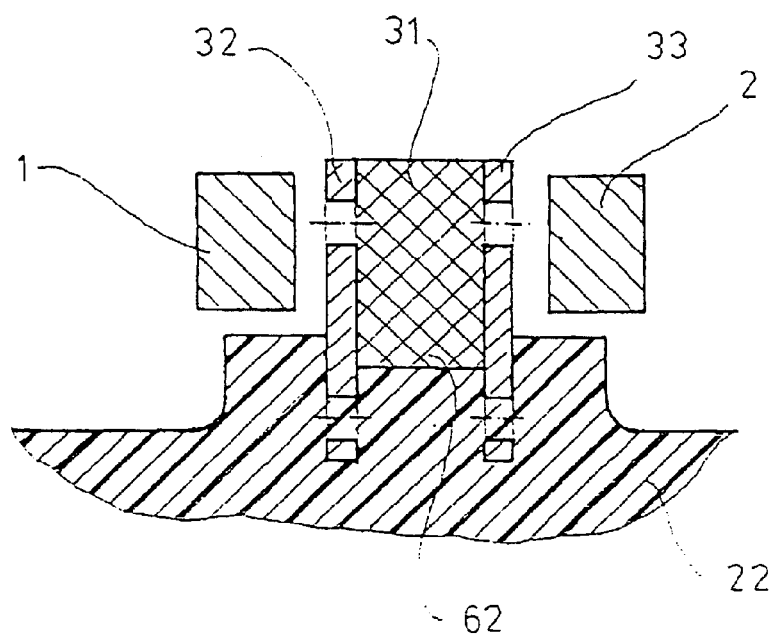

According to FIGS. 10c, 11c and 12c, the magnetic elements consist only of magnetic segment 31, on whose sides the two flux conductor sheets are molded-in in the manner already described. Relative to magnetic segment 30, the magnetic poles are marked differently only for purposes of explanation. It is of special significance that even more magnetic material is saved by the use of only one magnetic segment.

Figure 11D:
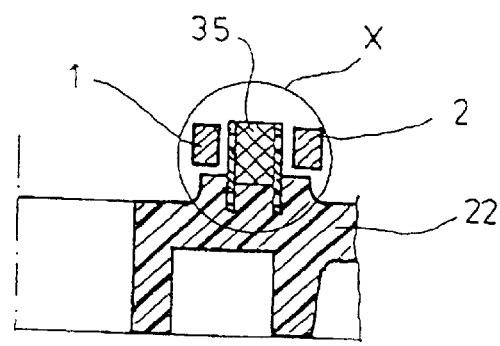
Figure 10D:
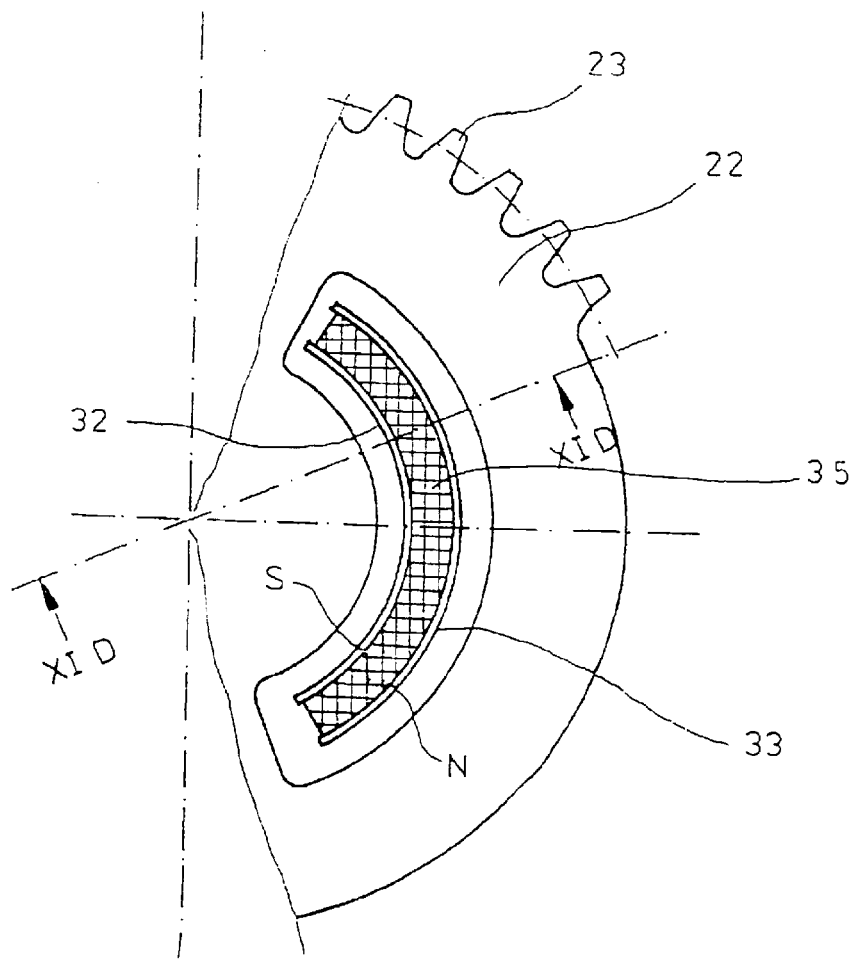
Figure 11:
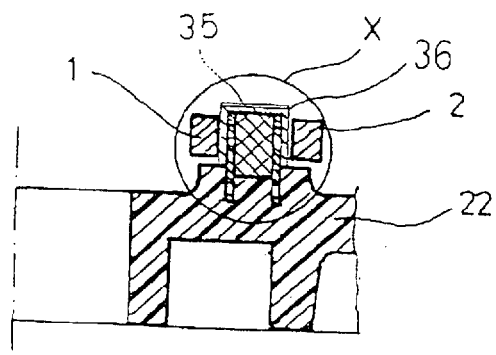
Figure 10:
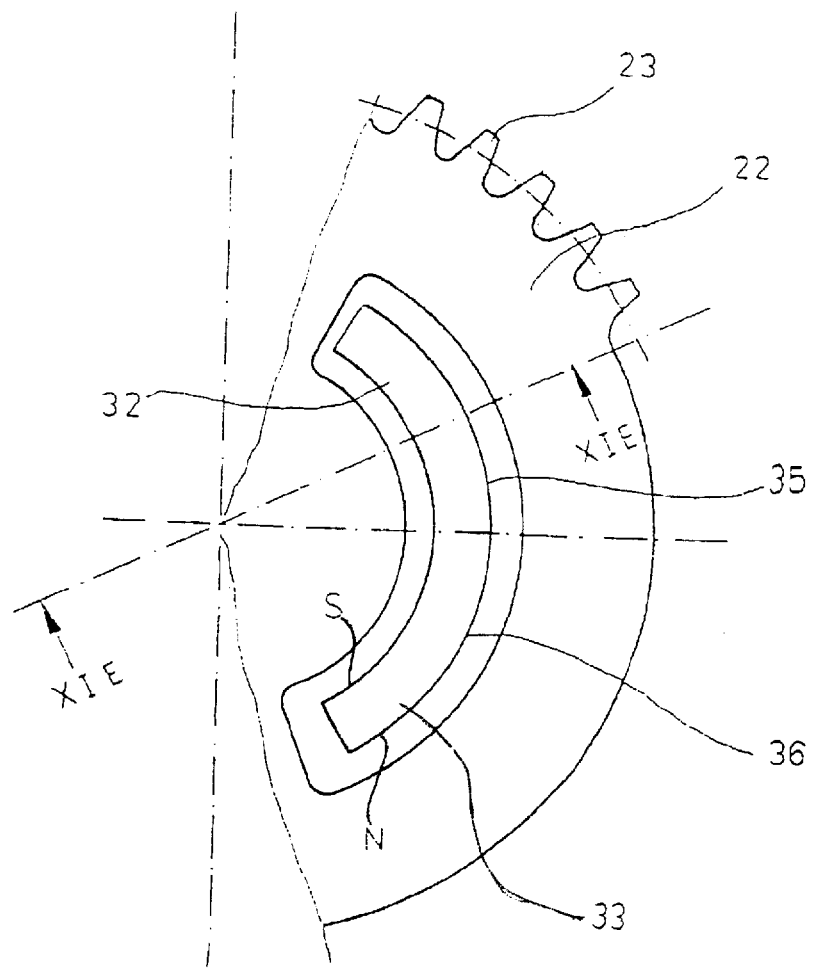
Figure 11:
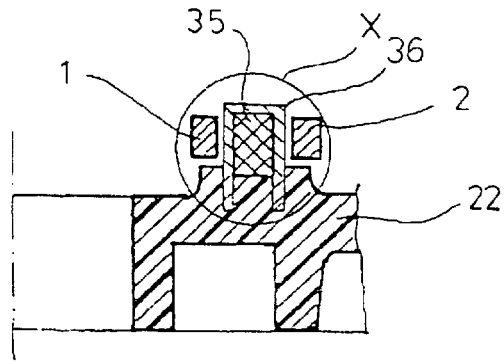
Figure 10:
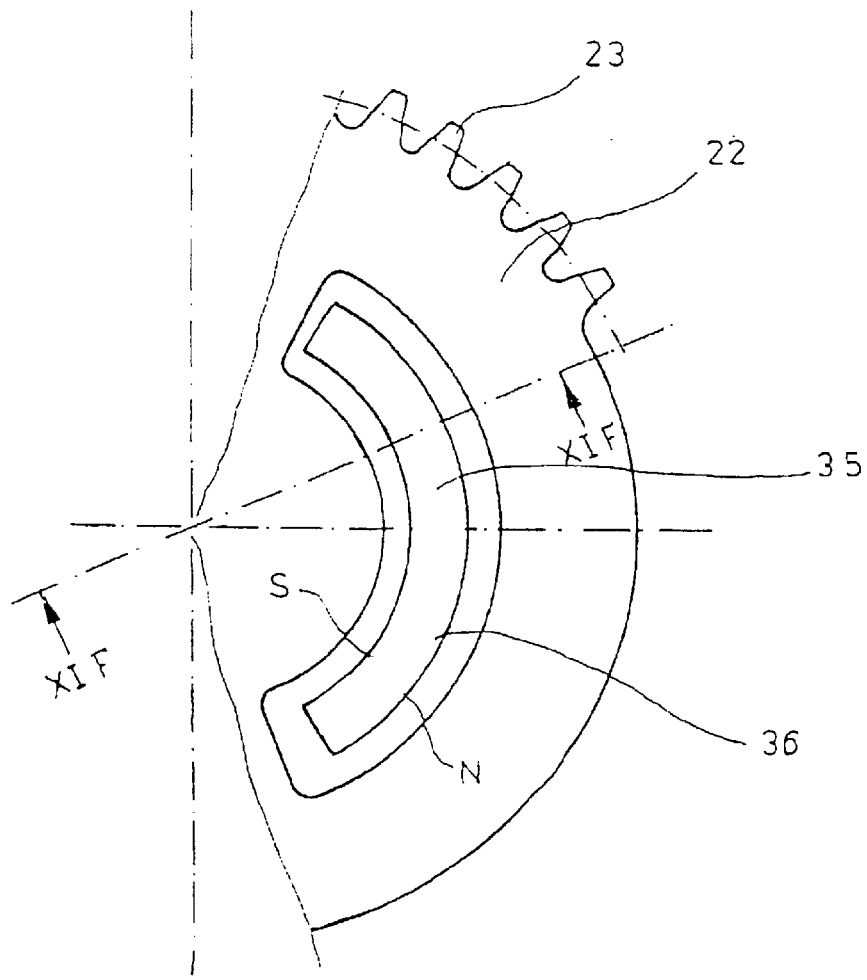
Figure 12D:
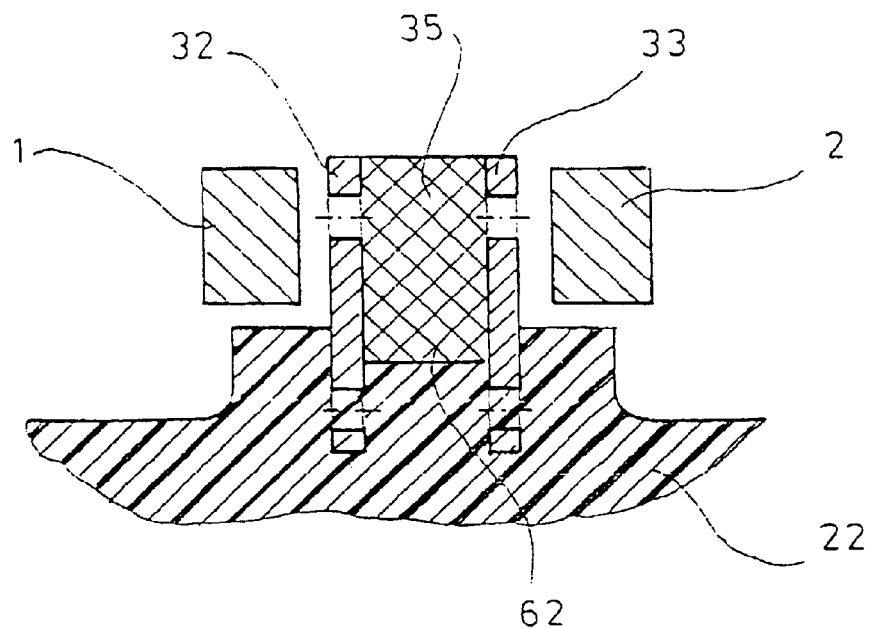

According to FIGS. 10d, 11d and 12d, the magnetic segment consists of a magnetic segment 35 that has roughly the same length as the adjacent flux conductor sheets 32,33, so that no plastic element is situated between them, as shown, in particular, in FIG. 12d. Their molding occurs in the manner already described. The flux conductor sheets here assume a protective function, in particular, for the magnetic segment.

Figure 12E:
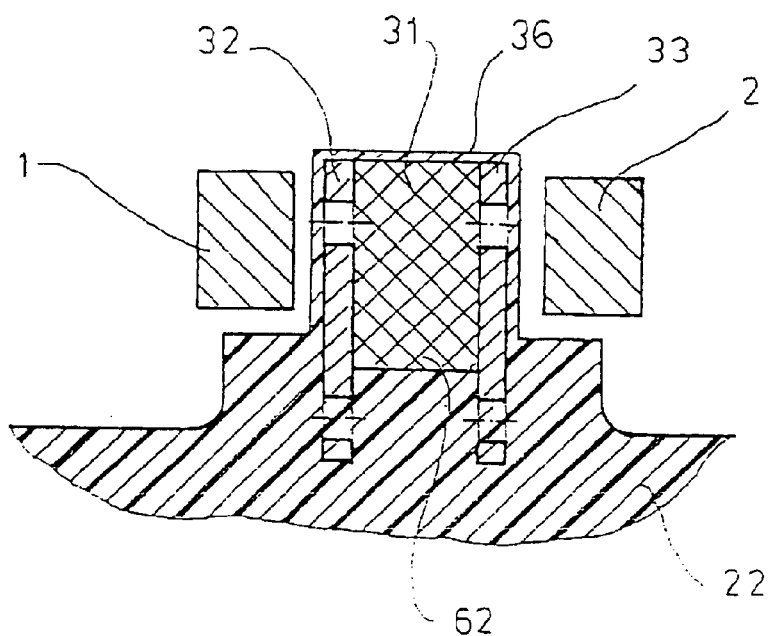

In FIGS. 10e, 11e and 12e, the magnetic segment consists of a magnetic segment 35, as in FIGS. 10d, 11d and 12d, which has the same length as the adjacent flux conductor sheets 32,33, only these are coated with a plastic outer element 36. Because of this, these parts are covered on all sides with plastic and effectively protected from outside influences.

The configurations according to FIGS. 10a, 11a and 12a, 10b, 11b and 12b, as well as 10c, 11c and 12c, can also be coated by plastic element 36 in the same manner.

Figure 12F:
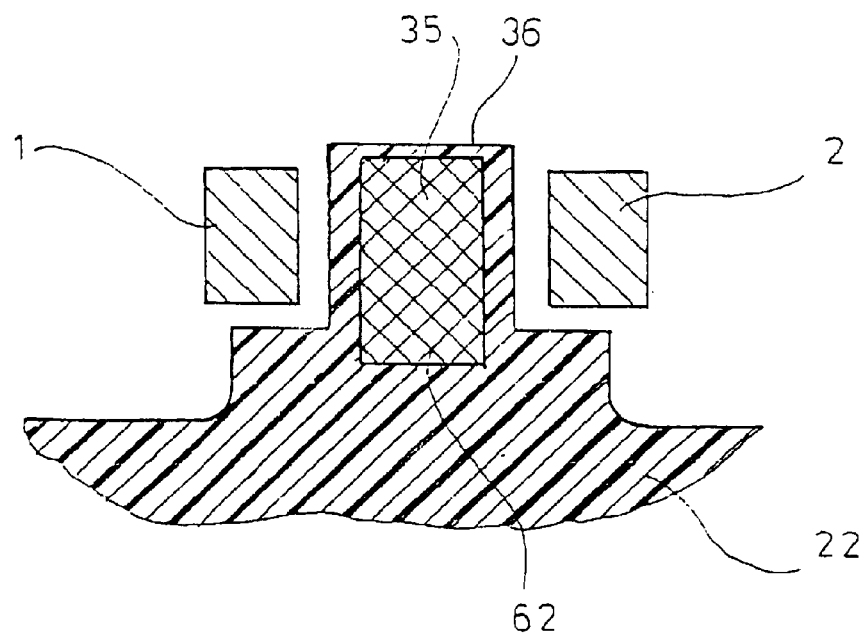

In FIGS. 10f, 11f and 12f, the magnetic segment 35 is coated fully by the plastic outer element 36, which provides the already described advantages. In the same manner, the individual magnetic segments 30 and 31 without flux conductor sheets according to FIGS. 10a, 11a and 12a and FIGS. 10b, 11b and 12b can be coated in similar fashion.

Figure 13:
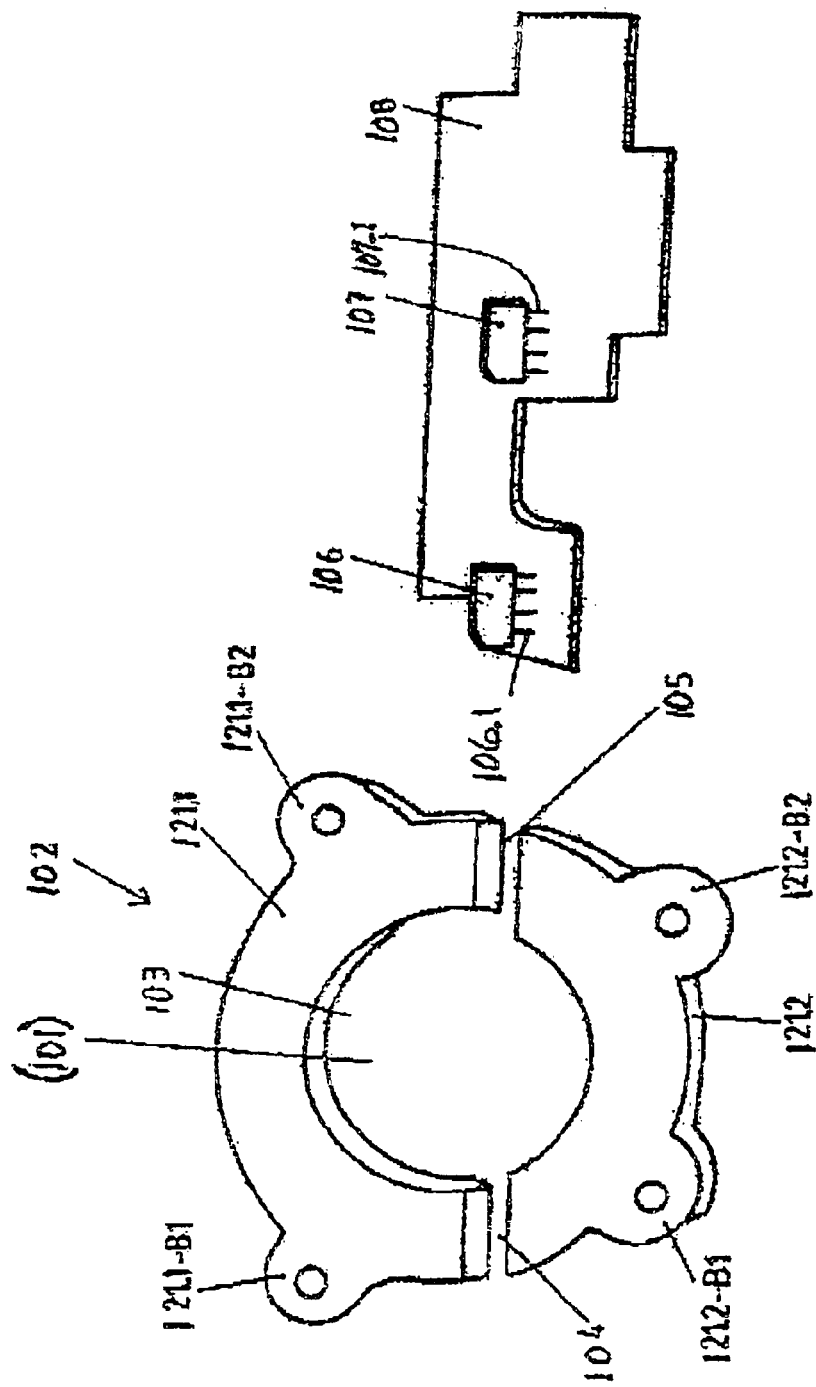
FIG. 13 shows an exploded, schematic, perspective view of a stator unit of a wide-angle rotation angle sensor.
Figure 14:
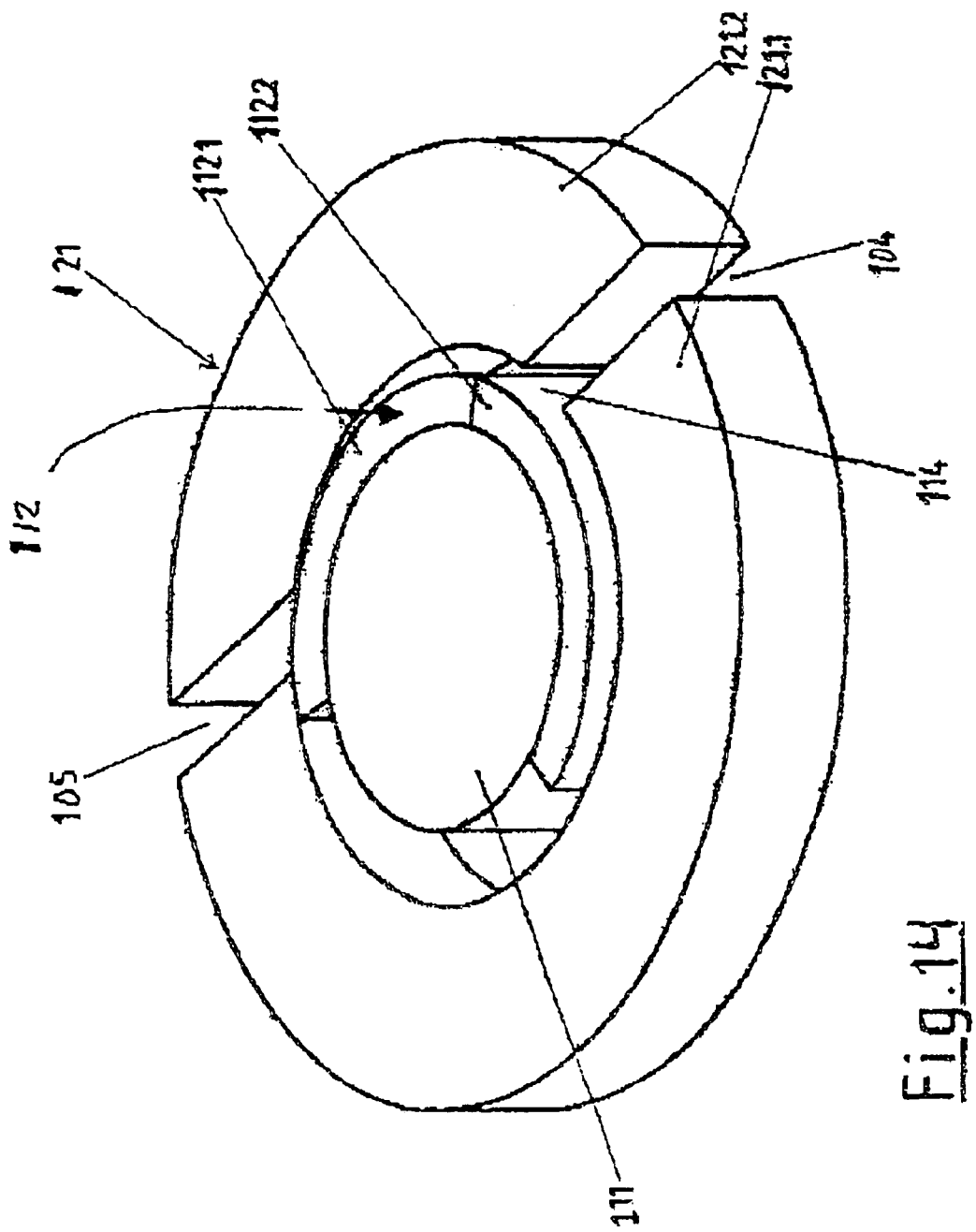
FIG. 14 shows a schematic, perspective view of a wide-angle rotation angle sensor with a rotor unit and a stator unit.
Figure 15:
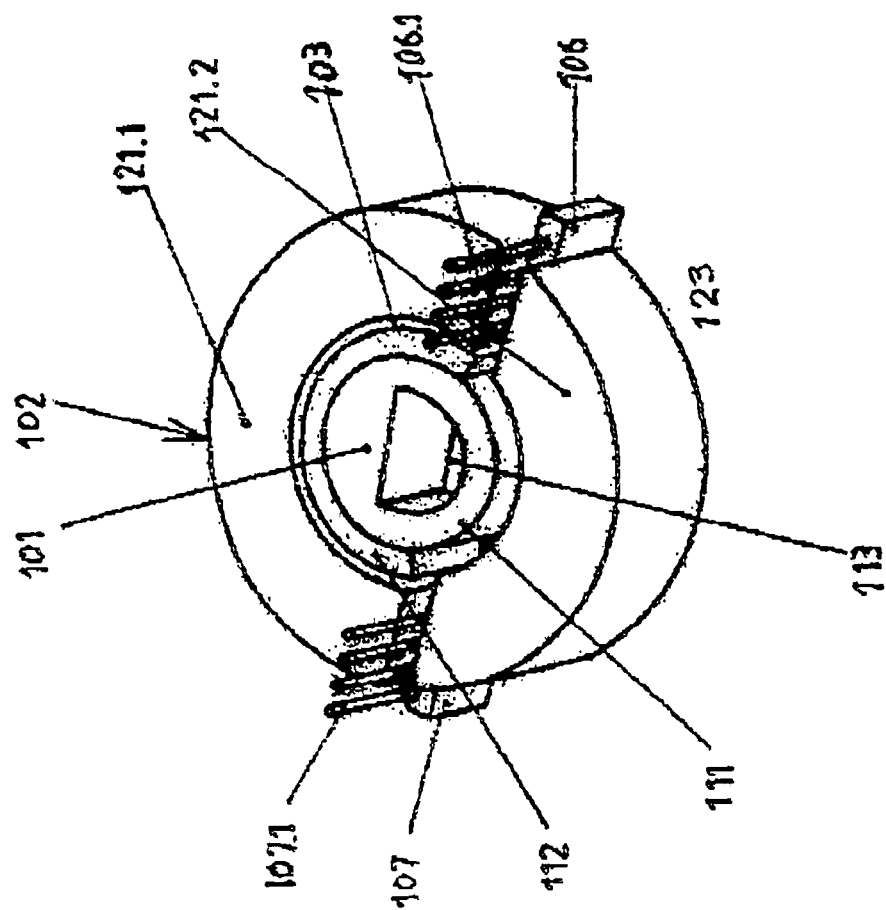
FIG. 15 is a bottom view of a wide-angle rotation angle sensor according to FIG. 14 with a built-in Hall unit.

FIGS. 13 to 15 show a wide-angle rotation angle sensor. It consists of a rotor unit 101, and a stator unit 102.

As especially shown in FIGS. 13 and 14, the rotor unit 101 includes a magnet support element 111 made of a magnetically non-conducting material. The magnet support element 111 supports a magnet element 112 that consists of a north magnet segment element 112.1 and a south magnet segment element 112.2.

As especially FIG. 13 shows, the stator unit consists of a stator element 121. The stator element 121 is divided into a large partial stator element 121.1 and located opposite to it a small partial stator element 121.2. Co-linear spacer opening 104 and 105 are left open between the two partial stator elements. The two spacer openings are located in one plane.

The large stator element 121.1 exhibits two large stator fastening elements 121.1-B1 and 121.1-B2, which are located in a mirror image opposite to one another. openings are inserted in each of the elements 121.1-B1 and 121.1-B2.

The small partial stator element is designed in a similar fashion. Thus, it exhibits two small stator fastening elements 121.2-B1 and 121.2-B2, which are located opposite to one another, and in turn exhibit openings. ASIC circuit elements 106,107 that are connected with a pc-board element 108 are positioned in the two spacer openings 104, 105.

As especially FIGS. 13 and 15 show, the ASIC circuit elements 106, 107 exhibit connector elements 106.1 and 107.1 for their connection to the pc-board element 108. Assembly of the wide-angle rotation angle sensor is carried out as follows:

The two partial stator elements 121.1 and 121.2 are molded into a stator support unit 123. The stator support unit 123 (cf. FIG. 15) may be the housing of a damper flap element. The stator support unit 123 is made of a synthetic material. It is, thus, possible to mold in the large partial stator element 121.1 and the small partial stator element 121.2 in the proper position. Thereafter, the two ASIC circuit elements 106, 107 are pushed into the spacer openings 104, 105. Due to the fact that the two ASIC circuit elements 106, 1077 are connected to the pc-board element 108, they are positioned in the correct position in the spacer openings 104, 105.

With the rotor unit 101, the magnet element 112 is supported using a strip element 114 around a magnet support unit 111, which exhibits a shaft support opening 113. To this end, the two partial magnet segment elements 112.1 and 112.2 are first enclosed using a strip element 114 such that the north magnet segment element 112.1 and the south magnet segment element 112.2 are supported in their proper position at the magnet support element 111. The magnet support element 111 assumes the conventional role of a yoke. Thereafter, the magnet segment elements 112.1 and 112.2 that are supported in this manner are encased in a rotor element made of a synthetic material. In this manner, the two magnet segment elements 112.1 and 112.2 find a fixed position in the rotor element. The rotor element may be a gear wheel or the like.

The function of the wide-angle rotation angle sensor will be explained based on FIGS. 16a to 17c.

Figure 16C:
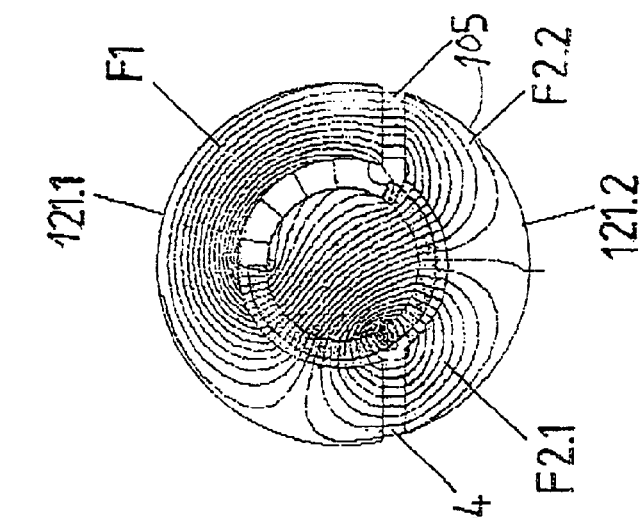
FIGS. 16a–c show the magnetic flux profile of a wide angle rotation angle sensor according to FIGS. 13 to 15 at various positions of the rotor unit.
Figure 16B:
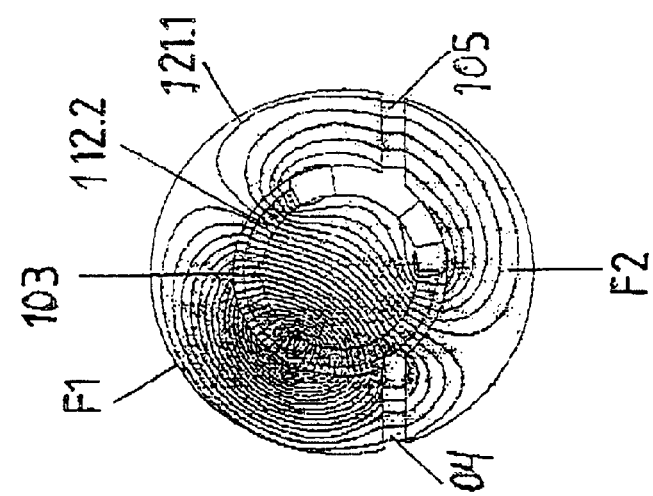
Figure 16A:
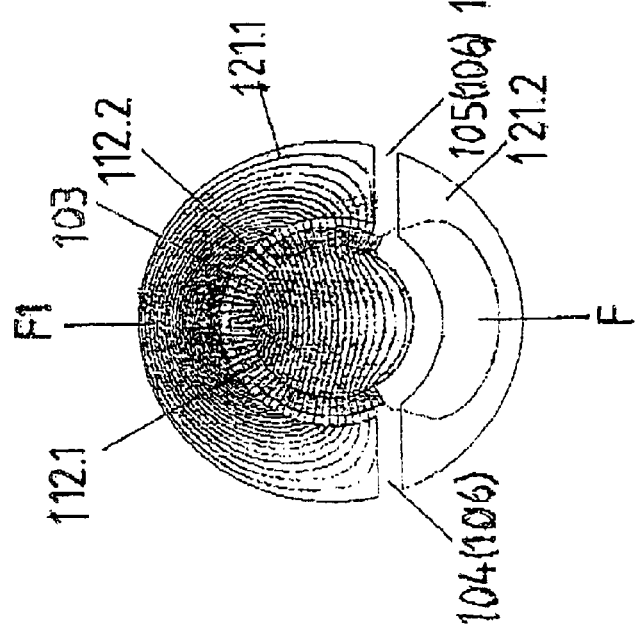

FIGS. 16a to c show various positions of the rotor unit 101 in relation to the stator unit 102.

In the 0° position according to FIG. 16a, the north magnet segment element 112.1 and the south magnet segment element 112.2 are located between the two spacer openings 104, 105. Thus, a main magnetic flux F1 flows mainly in the large stator element 121.1, through an air gap 103 that is situated between the rotor unit 101 and the stator unit 102, and through the magnet support element 111.

The rotor unit 101 is then moved in relation to the stator unit 102 to the 60° position according to FIG. 16b. In this position, the main magnetic flux F1 flows through the large stator element 121.1, at least partially through the spacer opening 104 and closes via the air gap 103 and the magnet support element 111. In addition, an ancillary magnetic flux F2 is formed, which flows through the small stator element 121.2, the spacer opening 105, and thus through the ASIC circuit element 107 and partially through the large stator element 121.1.

In the next step, the rotor unit 101 is turned in relation to the stator unit 102 to the 120° position according to FIG. 16c. In this position, the main magnetic flux F1 flows essentially through the large partial stator element 121.1 and is closed via the air gap 103 and the magnet support element 111. The main magnetic flux F1 penetrates the spacer opening 105 and the ASIC circuit element 107. The ancillary magnetic flux F2, on the other hand, splits into a partial ancillary magnetic flux F2.1 that flows essentially around the spacer opening 104 and a partial ancillary magnetic flux F2.2, which flows essentially around the spacer opening 105. The two ancillary magnetic fluxes are of equal size.

Figure 17A:
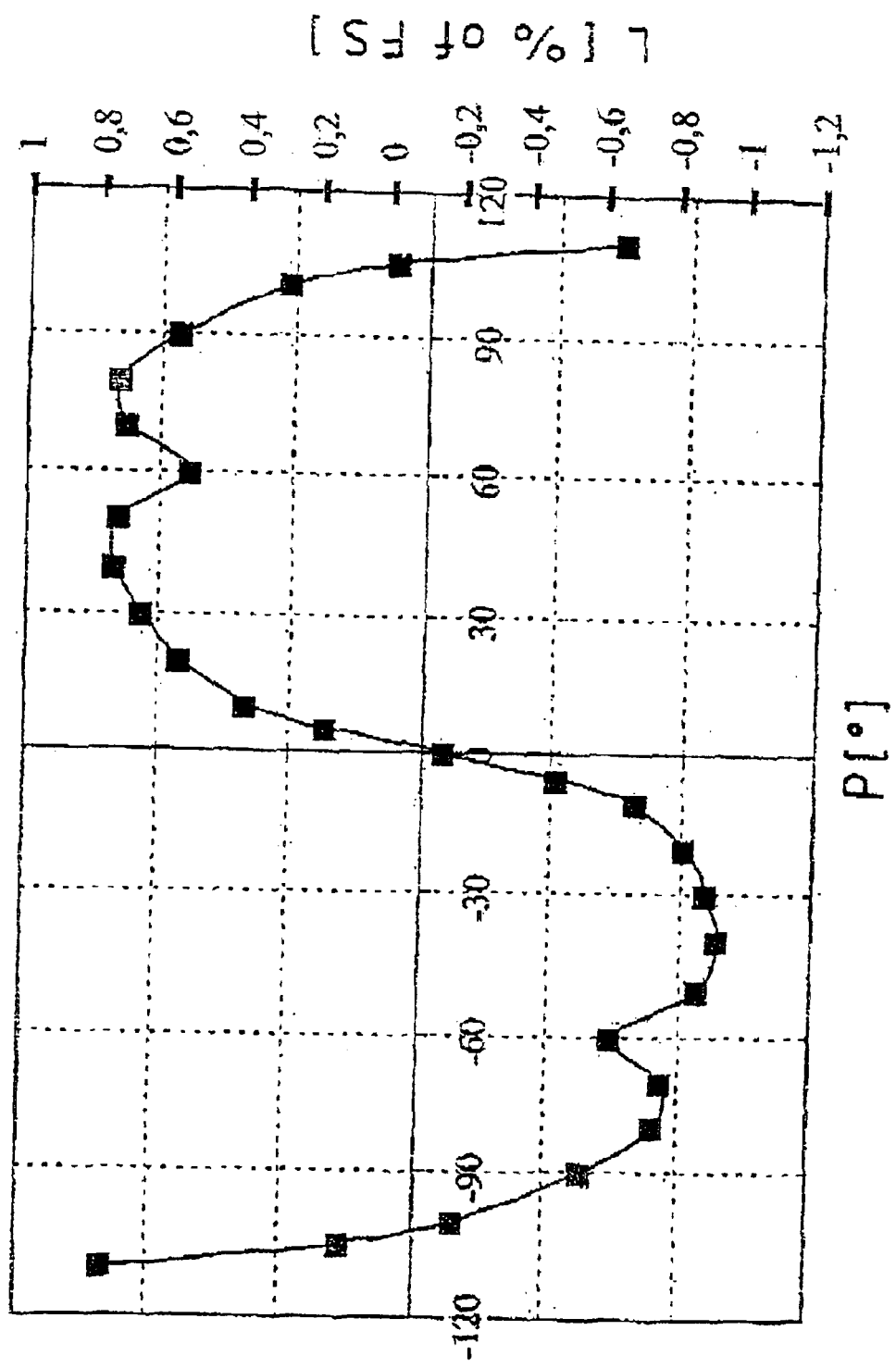
FIGS. 17a–c are schematic presentations of various signal profiles of a wide-angle rotation angle sensor according to FIGS. 13 to 16c.

As FIG. 17a shows, a linearity L has an essentially sinus-shaped profile in relation to a position P during the movement between 0° and 120°, which is system-related.

Figure 17B:
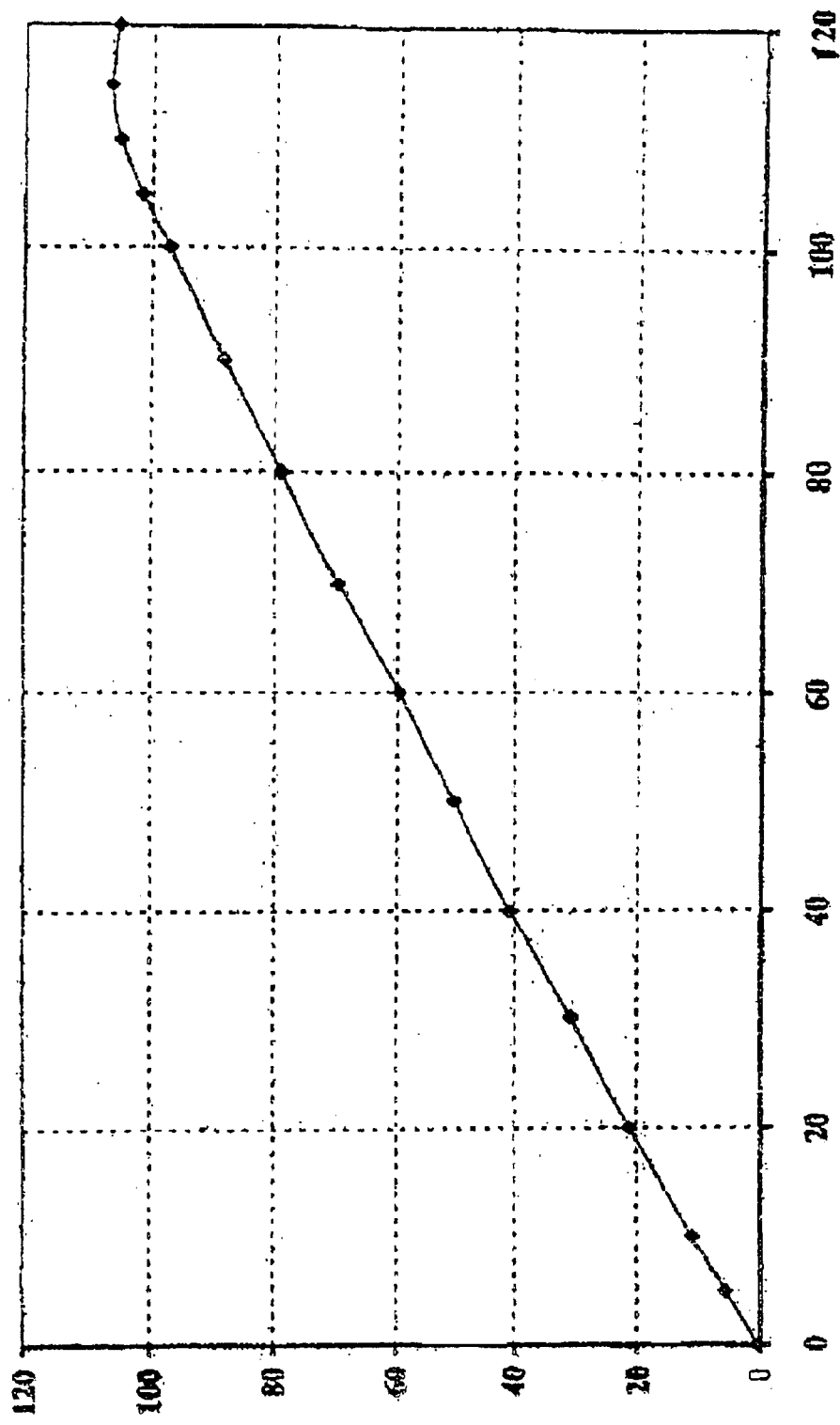

However, it essential that the induction I in mT has an essentially linear profile in relation to the position P in degrees from 0° to 120°, as FIG. 17b indicates.

Figure 17C:
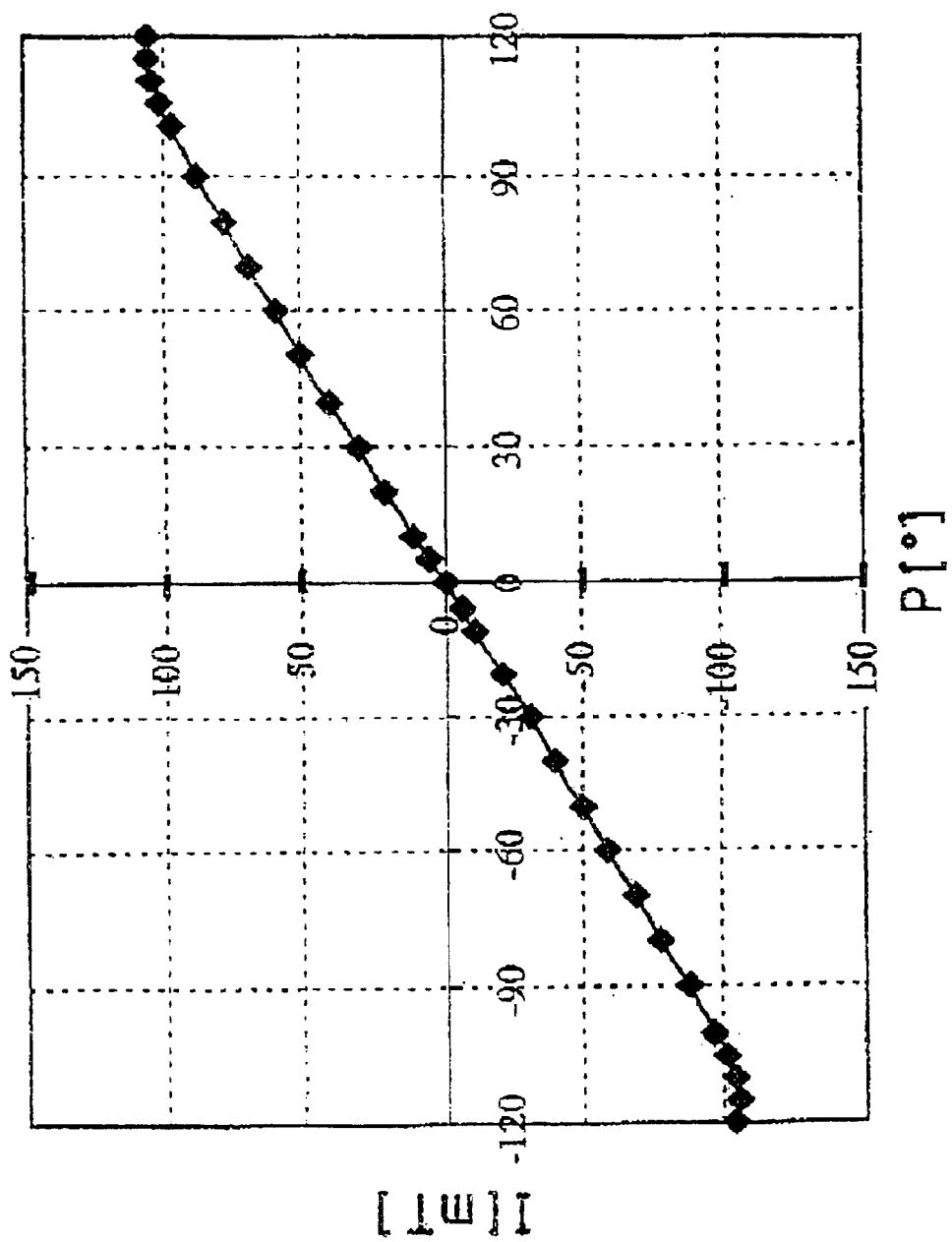

Due to this, it is possible to generate an output signal at a rotation of the rotor unit in both rotational directions, as shown in FIG. 17c. That is, an output signal is generated corresponding to the induction, which is linear between −120° and +120°. In this manner, it is possible to linearly measure the angle that is assumed between the rotor unit 101 and the stator unit 102 without a break. Due to the linear measurement, it is possible to accurately determine the respective position and to use the obtained signal for further processing.

There has thus been shown and described a novel rotation angle sensor, including a wide angle rotation angle sensor, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A rotation angle sensor for use in a throttle adjustment device, said angle sensor comprising:
   a stator unit having at least two sickle-shaped stator part elements positioned relative to each other leaving a spacer recess therebetween;
   at least one Hall sensor positioned in the spacer recess;
   a rotor unit having a moving element on one side thereof engaged for rotation with the throttle adjustment device and having at least one sickle-shaped magnetic part element attached to said rotor unit at least partially by molding, said rotor unit being moveable relative to said stator unit with said magnetic part element movable within said spacer recess; and
   a housing unit adapted to at least partially house the stator unit, the Hall sensor and the rotor unit.

2. A rotation angle sensor according to claim 1, further comprising a sealing ring positioned between the rotor unit and the housing unit.

3. A rotation angle sensor as set forth in claim 1, wherein the housing unit is a partial damper flap housing, and the other is a moving element is connected to a damper flap shaft.

4. A rotation angle sensor as set forth in claim 1, wherein the moving element is a gear wheel.

5. A rotation angle sensor as set forth in claim 1, wherein the sickle-shaped stator part elements have a pitch circle of approximately 115°.

6. A rotation angle sensor according to claim 1, wherein the stator unit is at least partially a drive part of housing unit and the rotor unit is at least partially a part of a gear mechanism of the throttle adjustment device.

7. A rotation angle sensor according to claim 6, wherein the drive part is a gear segment.

8. A rotation angle sensor according to claim 1, wherein said sickle-shaped magnetic part element comprises at least a one magnetic segment.

9. A rotation angle sensor according to claim 8, further comprising a flux conductor sheet molded into the rotor unit on both sides of two magnetic segments having a spacer therebetween.

10. A rotation angle sensor according to claim 8, further comprising a flux conductor sheet molded into the rotor unit on at least one side of at least one magnetic segment.

11. A rotation angle sensor according to claim 10, said flux conductor sheet being equal length to said at least one magnetic segment.

12. A rotation angle sensor according to claim 10, said flux conductor sheet being essentially longer than at least a second magnetic segment.

13. A rotation angle sensor according to claim 12, further comprising a mounting element molded in a space between the flux conductor sheet and the second magnetic segment.

14. A rotation angle sensor according to claim 13, wherein the first magnetic segment is at least partially enclosed by an outer element.

15. A rotation angle sensor according to claim 14, wherein at least one of the first magnetic segment, or the second magnetic segment and the flux conductor sheet are least partially enclosed by the outer element.

16. A rotation angle sensor according to claim 1, further comprising stamped lead assembly connected in series to a plurality of sensor contacts of at least one Hall sensor.

17. A rotation angle sensor according to claim 16, further comprising a second stamped lead assembly connected electrically in parallel to the sensor contacts of said at least one Hall sensor.

18. A rotation angle sensor according to claim 17, wherein said housing unit comprises a housing wall, into which the first and second stamped lead assembly are molded, a housing sensor block which is molded with the housing wall, and housing stator walls formed with the housing wall, and in which the connector elements of the stator segments are molded.

19. A rotation angle sensor according to claim 18, further comprising a further stator segment connected to at least one of the two stator segments.

20. A rotation angle sensor according to claim 18, further comprising a second housing unit having a housing element into which the connector elements of the stator half-disks and the third and fourth pressed screens stamped lead assemblies are molded in.

21. A rotation angle sensor according to claim 20, wherein at least one component is molded in with the stamped lead assemblies in the first and second housing units.

22. A rotation angle sensor according to claim 20, wherein the first and second housing units are formed from a magnetically and electrically nonconducting material.

23. A rotation angle sensor according to claim 20, wherein the first and second housing units comprise at least one of a cover element of a sensor housing, a housing of a sensor housing, a cover element of the throttle adjustment device and a housing of the throttle adjustment device.

24. A rotation angle sensor for use in a throttle adjustment device, said angle sensor comprising:
  a stator unit having at least two sickle-shaped stator part elements, said at least two stator part elements being positioned relative to each other leaving a spacer recess therebetween, each of said at least two stator part elements having a connector element;
  at least one Hall sensor positioned in the spacer recess;
  a rotor unit having at least one sickle-shaped magnetic part element, said rotor unit with said magnetic part element being movable relative to stator unit;
  a plug unit electrically connected to said at least one Hall sensor by a stamped lead assembly; and
  a housing unit adapted at least partially house the stator unit, wherein at least said connector elements of said stator part elements and the stamped lead assembly are at least partially molded into the housing element.

25. A rotation angle sensor according to claim 24, wherein said stator part elements are formed as sickle-shaped stator segments.

26. A rotation angle sensor according to claim 24, further comprising at least one component arranged on the stamped lead assembly.

27. A rotation angle sensor for use in a throttle adjustment device, said angle sensor comprising:
  a stator unit having at least two stator part elements, said at least two stator part elements being positioned relative to each other leaving a spacer recess therebetween;
  at least one Hall sensor positioned in the spacer recess;
  a rotor unit having at least one sickle-shaped magnetic part element, said rotor unit being movable relative to said stator unit, said at least one magnetic part element comprising two parallel flux conductor sheets, and at least one magnetic segment element in between the flux conductor sheets; and
  a housing unit adapted to at least partially house the stator unit, the Hall sensor and the rotor unit.

28. A rotation angle sensor as set forth in claim 27, wherein one magnet segment element is a north magnet segment element and the other is a south magnet segment element.

29. In a rotation angle sensor comprising a stator unit comprising two asymmetric partial stator elements positioned relative to each other to leave two spacer openings therebetween, at least one Hall sensor located in at least one spacer opening, and a rotor unit comprising a magnet element supported by a magnet support element, and which is movable relative to the stator elements while maintaining an air gap, the improvement, wherein the partial stator elements are divided in the shape of partial rings, comprising a large partial stator element and a small partial stator element, in a ratio of about 2/3 to 1/3, with the two co-linear spacer openings therebetween.

30. A rotation angle sensor according to claim 29, wherein the at least two stator elements comprise half-disks in the shape of apple segments.

31. An improved rotation angle sensor as set forth in claim 29, wherein the Hall units positioned in the spacer openings are connected to a pc-board element.

32. An improved rotation angle sensor as set forth in claim 29, wherein the large and the small partial stator elements further comprise protrusions into the area of the spacer openings.

33. An improved rotation angle sensor as set forth in claim 29, further comprising at least one stator fastening element.

34. An improved rotation angle sensor as set forth in claim 29, wherein said large partial stator element further comprises two large partial stator fastening elements located in a mirror image opposite to one another.

35. An improved rotation angle sensor as set forth in claim 29, wherein said small partial stator element further comprises two small partial stator fastening elements located in a mirror image opposite to one another.

36. An improved rotation angle sensor as set forth in claim 29, further comprising a strip element, at least partially enclosing said magnet segment elements, and thereby supporting the partial magnet segment elements on the stator support unit.

37. An improved rotation angle sensor as set forth in claim 36, wherein the partial magnet segment elements supported by the strip element are molded into the stator support unit.

38. An improved rotation angle sensor as set forth in claim 29, wherein the Hall sensors comprise ASIC circuit elements that each exhibit a Hall element.

39. An improved rotation angle sensor as set forth in claim 29, wherein at least parts of the large and the small stator elements are molded of an electrically non-conducting material, and wherein the magnet element comprises two magnetically bi-polar partial magnet segment elements, at least parts of which are molded of an additional electrically non-conducting material.

40. An improved rotation angle sensor as set forth in claim 29, wherein the large and the small partial stator elements comprise magnetically conducting material.

41. An improved rotation angle sensor as set forth in claim 40, wherein the magnetically conducting material is a sintered iron.

42. An improved rotation angle sensor as set forth in claim 40, wherein the magnetically non-conducting material is a synthetic material.

* * * * *